United States Patent
Ren et al.

(10) Patent No.: US 12,468,529 B2
(45) Date of Patent: Nov. 11, 2025

(54) PATCH REUSE METHOD AND SYSTEM, AND ELECTRONIC DEVICE

(71) Applicant: Huawei Technologies Co., Ltd., Shenzhen (CN)

(72) Inventors: Wenjie Ren, Beijing (CN); Hongxi Li, Beijing (CN); Yonghong Yin, Beijing (CN); Yingwei Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 18/247,132

(22) PCT Filed: Sep. 17, 2021

(86) PCT No.: PCT/CN2021/118904
§ 371 (c)(1),
(2) Date: Mar. 29, 2023

(87) PCT Pub. No.: WO2022/068605
PCT Pub. Date: Apr. 7, 2022

(65) Prior Publication Data
US 2024/0004642 A1    Jan. 4, 2024

(30) Foreign Application Priority Data
Sep. 30, 2020    (CN) .......................... 202011064590.6

(51) Int. Cl.
*G06F 8/658*    (2018.01)
*G06F 8/36*    (2018.01)

(52) U.S. Cl.
CPC ............... *G06F 8/658* (2018.02); *G06F 8/36* (2013.01)

(58) Field of Classification Search
CPC ................................. G06F 8/658; G06F 8/36
(Continued)

(56) References Cited

U.S. PATENT DOCUMENTS 6,135,651 A * 10/2000 Leinfelder ............... G06F 8/66
   712/E9.015
6,493,871 B1 * 12/2002 McGuire .................. G06F 8/65
   717/172
(Continued)

FOREIGN PATENT DOCUMENTS

CN    107580071 A    1/2018
CN    110149370 A    8/2019

OTHER PUBLICATIONS

Hu et al, "Automatically Patching Vulnerabilities of Binary Programs via Code Transfer From Correct Versions", IEEE, pp. 1-15 (Year: 2019).*

(Continued)

*Primary Examiner* — Anil Khatri
(74) *Attorney, Agent, or Firm* — Slater Matsil, LLP

(57) ABSTRACT

A patch reuse method, applied to a system that includes a plurality of devices and a patch server, where the patch server is configured to provide patches for the plurality of devices, the plurality of devices are located in a same local area network, and the plurality of devices include at least a first electronic device and a second electronic device. The method includes: The first electronic device sends a first patch query request including reused patch matching information to the patch server, where the reused patch matching information includes first patch matching information of the first electronic device and second patch matching information of the second electronic device; and the patch server sends, based on the reused patch matching information, a reused patch package including a patch file that is required by each device to the first electronic device.

16 Claims, 18 Drawing Sheets

(58) Field of Classification Search
USPC .................................................. 717/168–174
See application file for complete search history.

(56) References Cited

U.S. PATENT DOCUMENTS

| | | | | |
|---|---|---|---|---|
| 6,763,517 | B2 * | 7/2004 | Hines | G06F 8/66 |
| | | | | 717/124 |
| 7,823,148 | B2 * | 10/2010 | Deshpande | G06F 8/65 |
| | | | | 717/172 |
| 8,145,940 | B1 * | 3/2012 | Wang | G06F 21/57 |
| | | | | 714/6.1 |
| 8,233,739 | B1 * | 7/2012 | Cho | G06T 11/60 |
| | | | | 382/284 |
| 8,423,993 | B2 * | 4/2013 | Faus | G06F 8/65 |
| | | | | 717/169 |
| 9,727,738 | B1 * | 8/2017 | Kuhr | H04L 67/56 |
| 9,916,153 | B2 * | 3/2018 | Islam | G06F 9/5077 |
| 10,318,280 | B2 * | 6/2019 | Islam | G06F 11/2023 |
| 10,755,391 | B2 * | 8/2020 | Lin | G06T 5/77 |
| 2012/0198434 | A1 | 8/2012 | Dirstine et al. | |
| 2013/0263104 | A1 * | 10/2013 | Baset | G06F 8/70 |
| | | | | 717/168 |
| 2015/0301823 | A1 * | 10/2015 | Hatakeyama | G06F 8/658 |
| | | | | 717/173 |
| 2020/0133656 | A1 | 4/2020 | Mercille et al. | |

OTHER PUBLICATIONS

Shariffdeen et al, "Automated Patch Transplantation", ACM, pp. 1-36 (Year: 2020).*

Ren et al, "Automated Patching for Unreproducible Builds", ACM, pp. 1-12 (Year: 2022).*

Barnes et al, "PatchTable: Efficient Patch Queries for Large Datasets and Applications", ACM, pp. 1-10 (Year: 2015).*

Sethanandha. "Improving Open Source Software Patch Contribution Process: Methods and Tools", ACM, pp. 1-2 (Year: 2011).*

* cited by examiner

PATCH REUSE METHOD AND SYSTEM, AND ELECTRONIC DEVICE

CROSS-REFERENCE TO RELATED APPLICATIONS

This application is a National Stage of International Application No. PCT/CN2021/118904 filed on Sep. 17, 2021, which claims priority to Chinese Patent Application No. 202011064590.6, filed on Sep. 30, 2020, both of which are hereby incorporated by reference in their entireties.

TECHNICAL FIELD

This application relates to the field of communication technologies, and in particular, to a patch reuse method and system, and an electronic device.

BACKGROUND

A software patch (patch for short) is an applet released to fix vulnerabilities that are exposed in a use process of some software. For example, when a software developer develops software, some problems may be exposed after the software is released due to an ill-considered design or incomplete functions of a software program. To resolve these problems, the software developer usually makes a patch by modifying the original program or adding a new function, and then releases the patch, so that a user device downloads the patch to perform a patch update or a software upgrade.

Currently, the device can search for and download a required patch from a patch server, and install the patch. When a large number of devices need to download patches, the plurality of devices separately download the patches from the patch server. When the patch server delivers the patches to the plurality of devices, a patch may be downloaded from the patch server for multiple times and patch installation efficiency is low.

SUMMARY

This application provides a patch reuse method and system, and an electronic device, which can avoid a problem that a patch is downloaded from a patch server for multiple times, and implement quick patch installation on a plurality of devices, thereby improving patch installation efficiency.

To resolve the foregoing technical problem, according to a first aspect, an implementation of this application provides a patch reuse method, applied to a system that includes a plurality of devices and a patch server, where the patch server is configured to provide patches for the plurality of devices, the plurality of devices are located in a same local area network, and the plurality of devices include at least a first electronic device and a second electronic device. The method includes: The first electronic device sends a first patch query request to the patch server, where the first patch query request includes reused patch matching information, the reused patch matching information includes first patch matching information of the first electronic device and second patch matching information of the second electronic device, and each piece of the patch matching information is used to find a corresponding matching patch file; the patch server generates a reused patch package based on the first patch query request, and the patch server sends the reused patch package to the first electronic device, where the reused patch package includes a first patch file corresponding to the first patch matching information and a second patch file corresponding to the second patch matching information; the first electronic device receives the reused patch package, and the first electronic device extracts the first patch file that is to be installed on the first electronic device and the second patch file that is to be installed on the second electronic device; and the second electronic device obtains the second patch file from the first electronic device.

That is, when the plurality of devices in the same local area network need to download the patches, the first electronic device may serve as a reused patch downloading device in this local area network, and collectively obtain, from the patch server, the patch files required by the first electronic device and the second electronic device in the local area network, and then the first electronic device sends the obtained patch file to a corresponding device. It can be avoided that in the same local area network, the devices that need to download the patches need to separately download the patch packages from the patch server, thereby improving patch download and installation efficiency.

In a possible implementation of the first aspect, that the patch server generates a reused patch package based on the first patch query request includes: The patch server determines the first patch file corresponding to the first patch matching information, and determines the second patch file corresponding to the second patch matching information; and the patch server uses parts that are the same in the first patch file and the second patch file as a common part, uses parts that are different in the first patch file and the second patch file as a differential part, and uses the common part and the differential part as the reused patch package.

When the patch server generates the reused patch package, the patch server performs differential package reassembly on the reused patch package that needs to be downloaded by each device, uses the same part in the plurality of patch packages as the common part, and uses parts that are different in the plurality of patch packages as a differential part, so as to obtain the reused patch package that includes the common part and the differential part. A size of the reused patch package can be effectively reduced, so as to improve transmission efficiency of the reused patch package, reduce network resources that are occupied, and further reduce memory usage of the first electronic device caused by the reused patch package.

In a possible implementation of the first aspect, after that the first electronic device receives the reused patch package, the method further includes: The first electronic device decompresses the reused patch package to obtain the common patch and the differential patch; and the first electronic device performs patch restoration and synthesis processing based on the common patch and the differential patch to separately obtain the first patch file and the second patch file. In this way, the patch file required by each device can easily be obtained.

In a possible implementation of the first aspect, after that the patch serve generates a reused patch package based on the first patch query request, the method further includes: The patch server sends a patch push message for pushing the reused patch package to the first electronic device; after the first electronic device receives the patch push message, if the first electronic device detects an operation that a user confirms downloading the reused patch package, the first electronic device sends a first patch obtaining request to the patch server; and after the patch server receives the first patch obtaining request, the patch server send the reused patch package to the first electronic device.

In a possible implementation of the first aspect, the first electronic device and the second electronic device are trusted network devices that belong to a same local area network. Safety of patch reuse between the first electronic device and the second electronic device can be effectively improved.

In a possible implementation of the first aspect, that the first electronic device sends a first patch query request to the patch server includes: The second electronic device sends a second patch query request to the first electronic device, where the second patch query request includes the second patch matching information of the second electronic device, and after the first electronic device receives the second patch query request, the first electronic device sends the first patch query request to the patch server; or the first electronic device sends the first patch query request to the patch server based on a preset patch query period; or after the first electronic device receives a patch query instruction of a user, the first electronic device sends the first patch query request to the patch server.

In a possible implementation of the first aspect, each piece of the patch matching information includes device type information, device software version information, and patch type information of the obtained patch.

In a possible implementation of the first aspect, the plurality of devices further include a third electronic device, and the method further includes: The third electronic device obtains a network identifier of the local area network, and if the third electronic device determines, based on the network identifier, that the local area network in which the third electronic device is located is a trusted network, the third electronic device obtains the second patch matching information of the second electronic device that is in the local area network and that has a same device type as that of the third electronic device; and if the third electronic device determines that the second patch matching information is the same as third patch matching information of the third electronic device, the third electronic device obtains the second patch file from the second electronic device.

The second electronic device can provide a trusted patch source for another device in the local area network. When there is a newly added trusted device in the local area network, the newly added device can search in the local area network for a patch that needs to be downloaded by the newly added device. If there is a patch that needs to be downloaded by the newly added device, the newly added device can directly obtain the patch that needs to be downloaded from the second electronic device in the local area network, and does not need to download the patch from the patch server.

In a possible implementation of the first aspect, that the third electronic device determines that the local area network is a trusted network includes: If a trusted network identifier in the third electronic device includes the network identifier that is obtained by the third electronic device and that is of the local area network, the third electronic device determines that the local area network is a trusted network.

In a possible implementation of the first aspect, the method further includes: If the third electronic device determines that the second electronic device has installed the second patch file, the third electronic device obtains the second patch file from the second electronic device. That is, if the second electronic device has installed the second patch file, it indicates that the second electronic device has performed installation verification on the second patch file, which can effectively improve a success rate of installing the second patch file by the third electronic device.

In a possible implementation of the first aspect, the plurality of devices further include the third electronic device, and the method further includes: The third electronic device obtains the network identifier of the local area network, and if it is determined, based on the network identifier, that the local area network in which the third electronic device is located is an untrusted network, the third electronic device sends a third patch query request to the first electronic device, where the third patch query request includes third patch matching information of the third electronic device; if the first electronic device determines, based on the third patch matching request, that the reused patch package includes a patch file corresponding to the third electronic device, the first electronic device sends the reused patch package to the third electronic device; and the third electronic device receives the reused patch package, and the third electronic device extracts a patch file that is to be installed on the third electronic device.

In a possible implementation of the first aspect, the plurality of devices further include the third electronic device, and the method further includes: The third electronic device obtains the network identifier of a local area network, and if it is determined, based on the network identifier, that the local area network in which the third electronic device is located is an untrusted network, the third electronic device sends an obtaining request for the reused patch matching information to the first electronic device, to obtain the reused patch matching information; if the third electronic device determines, based on the reused patch matching information, that the reused patch matching information includes third patch matching information corresponding to the third electronic device, the third electronic device sends a reused patch obtaining request to the first electronic device; the first electronic device sends the reused patch package to the third electronic device based on the reused patch obtaining request; and the third electronic device receives the reused patch package, and extracting, by the third electronic device, the patch file that is to be installed on the third electronic device.

The first electronic device can provide a trusted patch source for another device in the local area network. When there is a newly added untrusted network device in the local area network, the newly added device can search in the local area network for a patch that needs to be downloaded by the newly added device. If there is a patch that needs to be downloaded by the newly added device, the newly added device can directly obtain an original reused patch package from the first electronic device in the local area network. This helps quickly fix the untrusted device in the local area network by using the patch.

According to a second aspect, an embodiment of this application provides a patch reuse method, applied to a first electronic device. The method includes: sending a first patch query request to a patch server, where the first patch query request includes reused patch matching information, the reused patch matching information includes first patch matching information of the first electronic device and second patch matching information of a second electronic device that belongs to a same local area network as the first electronic device, and each piece of the patch matching information is used to find a corresponding matching patch file; receiving a reused patch package that is sent by the patch server and that is generated based on the first patch query request, where the reused patch package includes a first patch file corresponding to the first patch matching information and a second patch file corresponding to the second patch matching information; and extracting, from the reused patch package, the first patch file that is to be installed on the first electronic device and the second patch file that is to be installed on the second electronic device, and sending the second patch file to the second electronic device.

That is, when the plurality of devices in the same local area network need to download the patch, the first electronic device may serve as a reused patch downloading device in this local area network, and collectively obtain, from the patch server, the patch files required by the first electronic device and the second electronic device in the local area network. It can be avoided that in the same local area network, the devices that need to download the patches need to separately download the patch packages from the patch server, thereby improving patch download and installation efficiency.

In a possible implementation of the second aspect, after the first electronic device receives the reused patch package, the method further includes: The first electronic device decompresses the reused patch package to obtain a common patch and a differential patch; and the first electronic device performs patch restoration and synthesis processing based on the common patch and the differential patch to separately obtain the first patch file and the second patch file.

In a possible implementation of the second aspect, the first electronic device and the second electronic device are trusted network devices that belong to a same local area network.

In a possible implementation of the second aspect, that the first electronic device sends a first patch query request to the patch server includes: The second electronic device sends a second patch query request to the first electronic device, where the second patch query request includes the second patch matching information of the second electronic device, and after the first electronic device receives the second patch query request, the first electronic device sends the first patch query request to the patch server; or the first electronic device sends the first patch query request to the patch server based on a preset patch query period; or after the first electronic device receives a patch query instruction of a user, the first electronic device sends the first patch query request to the patch server. In a possible implementation of the second aspect, each piece of the patch matching information includes device type information, device software version information, and patch type information of the obtained patch.

In a possible implementation of the second aspect, the method further includes: receiving a third patch query request sent by a third electronic device, where the third patch query request includes third patch matching information of the third electronic device, and if the first electronic device determines, based on the third patch matching request, that the reused patch package includes a patch file corresponding to the third electronic device, sending, by the first electronic device, the reused patch package to the third electronic device; and receiving, by the third electronic device, the reused patch package, and extracting, by the third electronic device, a patch file that is to be installed on the third electronic device. The third patch query request is a patch query request determined when the third electronic device obtains a network identifier of the local area network and it is determined, based on the network identifier, that the local area network in which the third electronic device is located is an untrusted network.

According to a third aspect, an embodiment of this application provides a patch reuse method, applied to a second electronic device. The method includes: sending, to a first electronic device that belongs to a same local area network as the second electronic device, a first patch query request used to query a patch, where the first patch query request includes second patch matching information of the second electronic device; and receiving and installing a second patch file sent by the first electronic device, where the second patch file is a patch file corresponding to the second patch matching information of the second electronic device.

That is, when the plurality of devices in the same local area network need to download the patches, the second electronic device can obtain, from the first electronic device, the second patch file that needs to be downloaded. It can be avoided that the second electronic device downloads the patch package from the patch server, thereby improving patch download and installation efficiency.

In a possible implementation of the third aspect, the method further includes: receiving a patch obtaining request sent by the third electronic device in the local area network, and sending the second patch file to the third electronic device, where the patch obtaining request is a patch query request; the third electronic device obtains a network identifier of the local area network; if determining, based on the network identifier, that the local area network in which the third electronic device is located is a trusted network, the third electronic device obtains the second patch matching information of the second electronic device that is in the local area network and that has a same device type as that of the third electronic device; and if the third electronic device determines that the second patch matching information is the same as third patch matching information of the third electronic device, the third electronic device obtains the second patch file of the second electronic device.

According to a fourth aspect, an embodiment of this application provides a patch reuse method, applied to a patch server, where the patch server is configured to provide a patch for an electronic device. The method includes: receiving a first patch query request sent by a first electronic device, where the first patch query request includes reused patch matching information, and the reused patch matching information includes first patch matching information of the first electronic device and second patch matching information of a second electronic device that belongs to a same local area network as the first electronic device; and generating a reused patch package based on the first patch query request, and sending the reused patch package to the first electronic device, so that the first electronic device obtains a first patch file and a second patch file based on the reused patch package.

That is, when the plurality of devices in the same local area network need to download the patch, the first electronic device may serve as a reused patch downloading device in this local area network, and collectively obtain, from the patch server, the patch files required by the first electronic device and the second electronic device in the local area network. It can be avoided that in the same local area network, the devices that need to download the patches need to separately download the patch packages from the patch server, thereby improving patch download and installation efficiency.

In a possible implementation of the fourth aspect, that the patch server generates a reused patch package based on the first patch query request includes: The patch server determines the first patch file corresponding to the first patch matching information, and determines the second patch file corresponding to the second patch matching information; and the patch server uses a same part in the first patch file and the second patch file as a common part, uses parts that are different in the first patch file and the second patch file as a differential part, and uses the common part and the differential part as the reused patch package.

In a possible implementation of the fourth aspect, after that the patch server generates a reused patch package based on the first patch query request, the method further includes: The patch server sends a patch push message for pushing the reused patch package to the first electronic device; and after the patch server receives the first patch obtaining request sent by the first electronic device, the patch server sends the reused patch package to the first electronic device. The first patch obtaining request is a request generated by the first electronic device after the first electronic device receives the patch push message and the first electronic device detects an operation that a user confirms downloading the reused patch package.

According to a fifth aspect, an embodiment of this application provides a patch reuse system, including a plurality of devices and a patch server, where the patch server is configured to provide patches for the plurality of devices, the plurality of devices are located in a same local area network, and the plurality of devices include at least a first electronic device and a second electronic device. The first electronic device is configured to send a first patch query request to the patch server, where the first patch query request includes reused patch matching information, the reused patch matching information includes first patch matching information of the first electronic device and second patch matching information of the second electronic device, and each piece of the patch matching information is used to find a corresponding matching patch file. The patch server is configured to generate a reused patch package based on the first patch query request, and send the reused patch package to the first electronic device, where the reused patch package includes a first patch file corresponding to the first patch matching information and a second patch file corresponding to the second patch matching information. The first electronic device is configured to receive the reused patch package, and extract the first patch file that is to be installed on the first electronic device and the second patch file that is to be installed on the second electronic device. The second electronic device is configured to obtain the second patch file from the first electronic device.

The patch reuse system provided in this application includes the first electronic device, the second electronic device, and the patch server that are configured to perform the first aspect and/or any possible implementation of the first aspect. Therefore, beneficial effects (or advantages) of the patch reuse method provided in the first aspect can also be implemented.

According to a sixth aspect, an embodiment of this application provides an electronic device, including: a memory, configured to store a computer program, where the computer program includes program instructions; and a control component, configured to execute the program instructions, so as to enable the electronic device to perform the foregoing patch reuse method.

According to a seventh aspect, an embodiment of this application provides a computer-readable storage medium, where the computer readable storage medium stores a computer program, the computer program includes a program instruction, and the program instruction is executed by a computer to enable an electronic device to perform the foregoing patch reuse method.

BRIEF DESCRIPTION OF THE DRAWINGS

To describe the technical solutions in embodiments of this application more clearly, the following briefly describes the accompanying drawings for describing embodiments.

DETAILED DESCRIPTION OF ILLUSTRATIVE EMBODIMENTS

The technical solutions according to this application are further clearly and completely described in the following with reference to the accompanying drawings.

Figure 1:
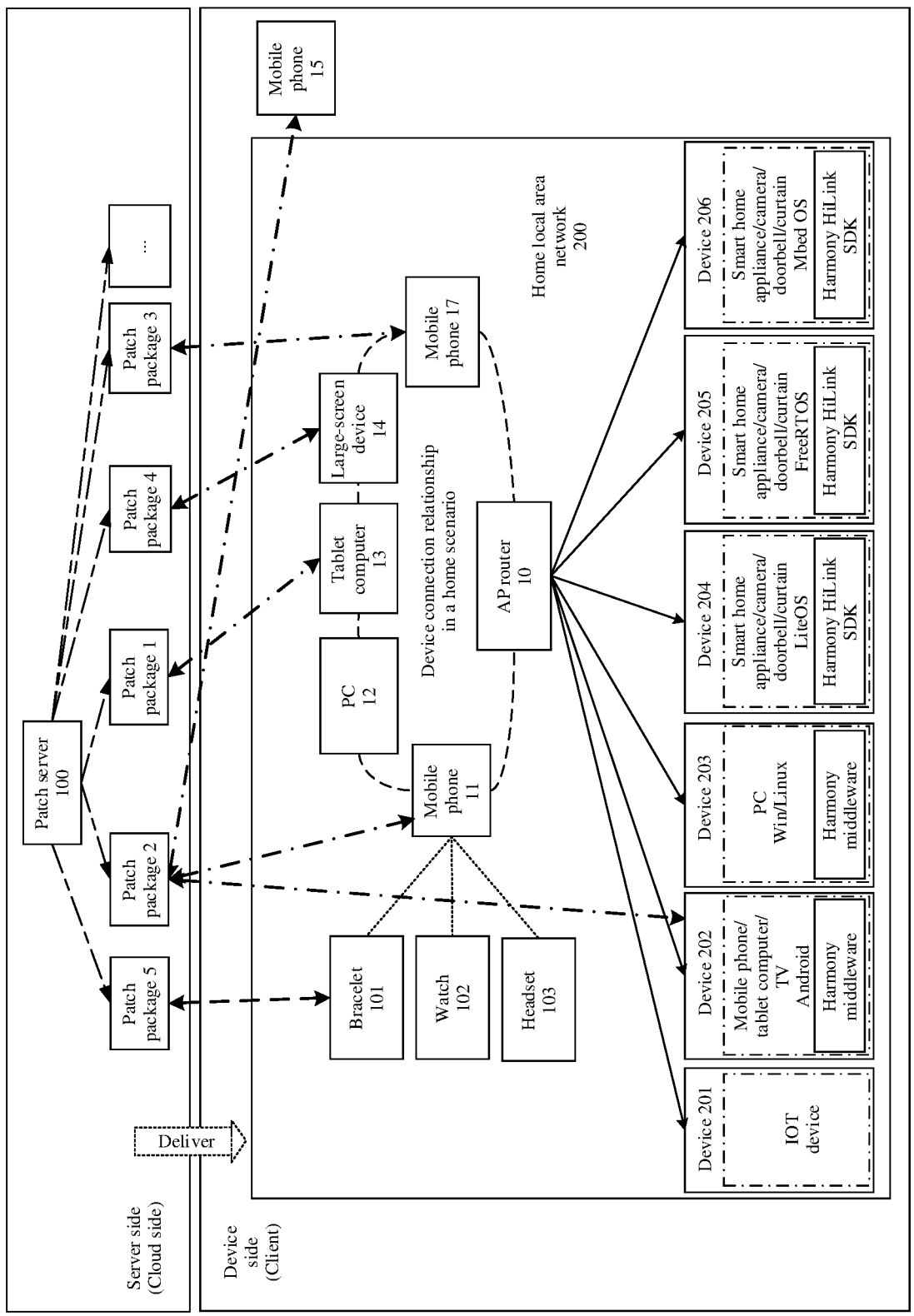
FIG. 1 shows an application scenario of patch downloading and installing by a plurality of devices in a conventional technology.

Refer to FIG. 1. This application provides a system for downloading and installing a patch. The system includes a server side device and a device side device.

The server side includes a patch server 100, and the patch server 100 may be a patch cloud server. Therefore, the server side may also be referred to as a cloud server side, or a cloud side for short.

Different pieces of software usually require different patches to fix different software problems. In addition, to fix same or similar software problems in one software in different types of devices, because the different types of devices have different requirements on patch files and patch types, different patches are also required. A patch is usually stored and transmitted in the form of a patch package.

Therefore, a patch is also referred to as a patch package. Therefore, the server side includes several patch packages, such as a patch package 1, a patch package 2, a patch package 3, a patch package 4, and a patch package 5, that are stored by using the patch server 100.

The device side includes a plurality of client electronic devices. Therefore, the device side may also be referred to as a client.

The device side includes an access point (Access Point, AP) router 10, a mobile phone 11, a personal computer (Personal Computer, PC) 12, a tablet computer 13, a large-screen device 14 (for example, a smart screen or a television), and a mobile phone 17. The mobile phone 11, the PC 12, the tablet computer 13, the large-screen device 14, and the mobile phone 17 separately establish a wireless local area network (Wireless Local Area Network, WLAN) (for example, a Wireless Fidelity (Wireless Fidelity, Wi-Fi) network) communication connection to the AP router 10.

The device side further includes a bracelet 101, a watch 102, and a headset 103. The bracelet 101, the watch 102, and the headset 103 separately establish a communication connection to the mobile phone 11 in a manner such as Bluetooth (Bluetooth, BT) or a mobile hotspot (Mobile Hotspot).

The device side may further include a device 201, a device 202, a device 203, a device 204, a device 205, and a device 206. The device 201 may be an Internet of Things (Internet of Things, IoT) device. The device 202 may be a device that has an Android system, such as a mobile phone/a tablet computer/a television (television, TV) that has Harmony middleware. The device 203 may be a device that has a Windows® or Linux® system, such as a PC that has Harmony middleware. The device 204 may be a device that has a LiteOS system, such as a smart home appliance, a camera, a doorbell, or a curtain that has a Harmony HiLink software development kit (Software Development Kit, SDK). The device 205 may be a device that has a FreeRTOS® system, such as a smart appliance/camera/doorbell/curtain that has the Harmony HiLink SDK. The device 206 may be a device that has an Mbed®OS system, such as a smart appliance/camera/doorbell/curtain that has the Harmony HiLink SDK. The device 201, the device 202, the device 203, the device 204, the device 205, and the device 206 separately establish a wireless local area network communication connection to the AP router 10.

The foregoing devices included on the device side may be considered as devices in a home local area network 200 corresponding to a home scenario. In the home local area network 200, the AP router 10 provides a wireless local area network for each device, and each device in the home local area network 200 may perform near field communication based on the wireless local area network. In addition, each device on the foregoing device side may also establish a communication connection to the AP router 10 in a manner of an Ethernet data line, or establish a communication connection to the AP router 10 in another manner.

In addition, the device side may further include a mobile phone 15. The mobile phone does not establish a communication connection to the AP router 10, and is a device outside the home local area network 200. The mobile phone 15 may be a device that is connected to a network by using a mobile data network (or a cellular network) of the mobile phone 15, or the mobile phone 15 may be a device that establishes a communication connection to another AP router that is different from the AP router 10.

For the system shown in FIG. 1, in the conventional technology, when a device side includes a plurality of devices, a process of fixing a software problem (or may also be referred to as a patch update) of the plurality of devices is that each device separately searches in the patch server 100 for a patch package (or may also be referred to as a patch search package, or a search package for short), and downloads the patch package; and the patch server 100 separately delivers the patch package corresponding to each device to a corresponding device. Each device installs the received patch package to complete patch installation.

For example, the mobile phone 11, the device 202, and the mobile phone 15 need to separately download the same patch package 2 from the patch server 100, and there is a problem that the patch package 2 is downloaded from the patch server 100 for multiple times. In addition, the tablet computer 13 needs to download the patch package 1 from the patch server 100, the mobile phone 17 needs to download the patch package 3 from the patch server 100, the bracelet 101 needs to download the patch package 5 from the patch server 100, the large-screen device 14 needs to download the patch package 4 from the patch server 100, and the like.

The patch package usually includes a patch file used to fix a software problem, and patch signature information used to perform security processing on the patch file. For different patch packages, it is often the case that patch files in the patch packages are partially the same. For example, some patch files in the patch package 1, the patch package 3, and the patch package 2 are the same. In addition, patch signature information of the patch package 1, the patch package 3, and the patch package 2 may be the same. Each device separately downloads the patch package 1, the patch package 2, and the patch package 3, and there is a problem that the same patch files and patch signature information are repeatedly downloaded, which causes a waste of network resources.

To be specific, in the conventional technology, the mobile phone 11, the tablet computer 13, the large-screen device 14, the mobile phone 17, the bracelet 101, the device 202, and the mobile phone 15 on the device side need to separately download a required patch package from the patch server 100. There are problems that the patch package is downloaded from the patch server 100 for multiple times, and efficiency of downloading and installing the patch on the mobile phone 11, the tablet computer 13, the large-screen device 14, the mobile phone 17, the bracelet 101, the device 202, and the mobile phone 15 is low.

This application provides a patch reuse method, applied to a scenario in which software on a plurality of devices is fixed in the system shown in FIG. 1. The scenario in which software on a plurality of devices is fixed is a scenario in which the plurality of devices jointly update a patch.

Figure 2:
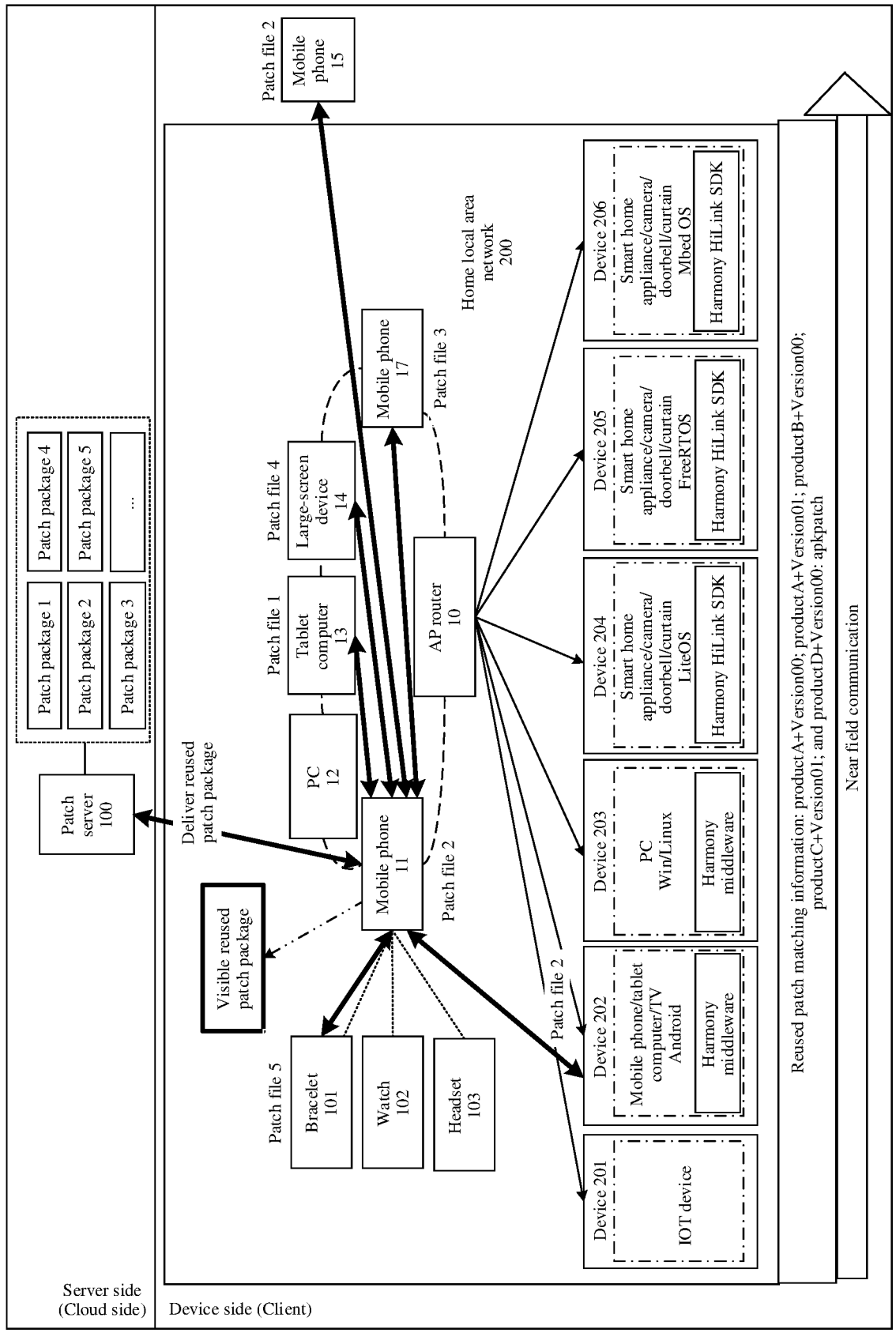
FIG. 2 shows an application scenario of patch downloading and installing by a plurality of devices according to some embodiments of this application.

As shown in FIG. 2, in an implementation of the patch reuse method provided in this application, when there are a plurality of devices on a device side, the mobile phone 11 may be used as a reused patch downloading device in the plurality of devices to send a patch query request to the patch server 100. The patch query request includes reused patch matching information (which may also be referred to as a reused patch profile (Profile)), and the reused patch matching information is information generated by the mobile phone 11 based on patch matching information of all devices, on a device side, on which patch query needs to be performed.

Each device includes software on which patch query needs to perform, and the software may be system software or application software. An example in which the software is application software (for example, may be video call application software) is used. When the application software needs to query a patch, the application software performs a patch query operation to generate patch matching information. The patch matching information is used by the patch server 100 to find a patch package matching the application software of the device.

Patch files of patch packages corresponding to different pieces of application software are different. Therefore, the patch matching information may include version information of the application software in the device. In addition, requirements for patch information such as patch files and types of patch packages corresponding to different types of devices are different. Therefore, the patch matching information may include a product category (which may also be referred to as a product type) of the device and a patch type of a patch that the device needs to obtain.

The product category of the mobile phone 11 may be, for example, a model (for example, mate 10 or P40) of the mobile phone 11, and a format of the product category may be productxx. The version information of the application software may be a version number, and a format of the version number may be Versionxx. The patch type can be used to indicate a capability patchtype of a patch that the mobile phone 11 can install, and a format of the patch type may be apkpatch, nativepatch, or the like. The patch type apkpatch mainly means a patch used to update application software, and the nativepatch mainly means a patch used to update system configuration software. The patch matching information may be productxx+Versionxx; apkpatch.

In addition, the product type of the mobile phone 11 may also be other product identification information used to identify the mobile phone 11, and the version information of the application software may also be other software identification information used to identify the application software, which may be selected according to requirements.

For a same software problem or similar software problems, when different devices download patches, patch matching information is different.

For example, on a device side, a device that quires a patch includes the mobile phone 11, the tablet computer 13, the large-screen device 14, the mobile phone 17, the bracelet 101, the device 202, and the mobile phone 15. The mobile phone 11 obtains reused patch matching information based on the patch matching information of the mobile phone 11, the tablet computer 13, the large-screen device 14, the mobile phone 17, the bracelet 101, the device 202, and the mobile phone 15, and sends the reused patch matching information to the patch server 100.

For a same software problem or similar software problems, when the different devices download software, the patch matching information is as follows.

The patch matching information of the mobile phone 11 is: productA+Version00; apkpatch.

The patch matching information of the tablet computer 13 is: productB+Version00; apkpatch.

The patch matching information of the mobile phone 17 is: productA+Version01; apkpatch.

The patch matching information of the large-screen device 14 is: productC+Version01; apkpatch.

The patch matching information of the bracelet 101 is: productD+Version00; apkpatch.

The patch matching information of the device 202 is: productA+Version00; apkpatch.

The patch matching information of the mobile phone 15 is: productA+Version00; apkpatch.

The mobile phone 11 may obtain a union set of each piece of the foregoing patch matching information to determine that the reused patch matching information is: productA+Version00; productA+Version01; productB+Version00; productC+Version01; or productD+Version00; apkpatch.

After the patch server 100 receives the patch query request, the patch server 100 may determine, based on the reused patch matching information included in the patch query request, whether there is a patch package that matches the reused patch matching information. If there is a patch package that matches the reused patch matching information, the patch server 100 packs all the matched patch packages as a reused patch package. The reused patch package includes patch files of patch packages that need to be downloaded by the mobile phone 11, the tablet computer 13, the large-screen device 14, the mobile phone 17, the bracelet 101, the device 202, and the mobile phone 15, and patch signature information for performing security processing on the patch files.

The patch server 100 sends a patch push message for pushing the reused patch package to the mobile phone 11. The patch push message includes patch description information such as a name of each patch package included in the reused patch package.

After the mobile phone 11 receives the patch push message, if the mobile phone 11 detects an operation that a user confirms downloading the reused patch package, the mobile phone 11 sends a patch obtaining request for downloading the reused patch package to the patch server 100. The patch server 100 uses, based on the patch obtaining request, a patch package (that is, a patch package corresponding to the reused patch matching information) that is required by the mobile phone 11, the tablet computer 13, the large-screen device 14, the mobile phone 17, the bracelet 101, the device 202, and the mobile phone 15 as the reused patch package, and delivers the reused patch package to the mobile phone 11 on the device side.

The mobile phone 11 receives the reused patch package sent by the patch server 100, and separately obtains, based on the reused patch package, patch files corresponding to the patch packages required by the mobile phone 11, the tablet computer 13, the large-screen device 14, the mobile phone 17, the bracelet 101, the device 202, and the mobile phone 15. The obtained patch files are, for example, a patch file 5 corresponding to the patch package 5 that needs to be downloaded by the bracelet 101, a patch file 2 corresponding to the patch package 2 that needs to be downloaded by the mobile phone 11, the device 202, and the mobile phone 15, a patch file 1 corresponding to the patch package 1 that needs to be downloaded by the tablet computer 13, and a patch file 3 corresponding to the patch package 3 that needs to be downloaded by the mobile phone 17, and a patch file 4 corresponding to the patch package 4 that needs to be downloaded by the large-screen device 14.

Then, the mobile phone 11 installs the patch file 2. In addition, the mobile phone 11 sends the patch file 2 required by the mobile phone 15 and the device 202 to the mobile phone and the device 202, sends the patch file 1 required by the tablet computer 13 to the tablet computer 13, sends the patch file 3 required by the mobile phone 17 to the mobile phone 17, sends the patch file 5 required by the bracelet 101 to the bracelet 101, and sends the patch file 4 required by the large-screen device 14 to the large-screen device 14. After the tablet computer 13, the large-screen device 14, the mobile phone 15, the bracelet 101, the device 202, and the mobile phone 15 separately receives the corresponding patch files, the tablet computer 13, the large-screen device 14, the mobile phone 15, the bracelet 101, the device 202, and the mobile phone 15 install the patch files to implement patch installation.

A process in which the patch server 100 generates the reused patch package and a process in which the mobile phone 11 obtains, based on the reused patch package, the patch file corresponding to each device are described in detail below.

In this application, near field communication is performed between the mobile phone 11, the tablet computer 13, the large-screen device 14, the mobile phone 17, the bracelet 101, the device 202, and another device in the home local area network 100. After the mobile phone 11 receives the reused patch package and obtains, based on the reused patch package, the patch file required by the device, the mobile phone 11 may broadcast, to the another device in the home local area network 100, a patch file included in the reused patch package obtained by the mobile phone 11, so that the patch file included in the reused patch package is visible in the home local area network 100. That is, the another device in the home local area network 100 may discover, download, and install the patch file included in the reused patch package.

For the mobile phone 15, the mobile phone 15 may establish a communication connection to the mobile phone 11 by using a mobile hotspot shared by the mobile phone 11 or Bluetooth. In addition, the mobile phone 15 may also establish a communication connection to the AP router 10, and the mobile phone 15 may perform near field communication with each device that establishes a communication connection to the AP router 10 in the home local area network 100.

In the patch reuse method provided in this application, when a plurality of devices on the device side need to download a patch, the mobile phone 11 may be used as a reused patch downloading device for all devices that establish a communication connection to the AP router 10 and all devices that establish a communication connection to the mobile phone 11. A patch file required by each device is obtained from the patch server 100, and then the obtained patch file is sent to the corresponding device, so that a device that needs to download a patch on the device side does not need to separately download a patch package from the patch server 100, thereby improving patch download and installation efficiency.

Figure 3:
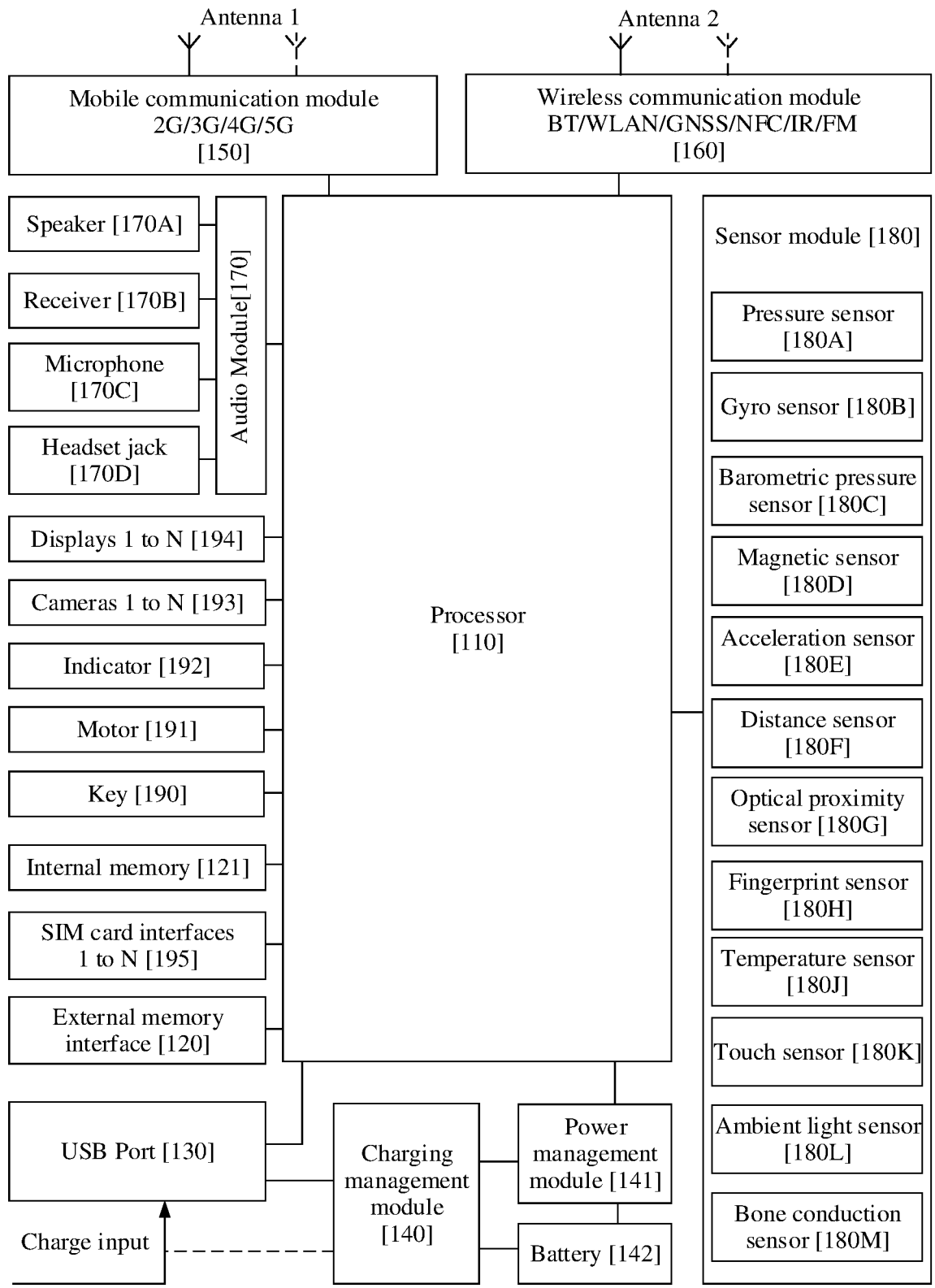
FIG. 3 is a schematic diagram depicting a structure of a mobile phone 11 according to some embodiments of this application.

FIG. 3 is a schematic diagram depicting a structure of a mobile phone 11 according to this application.

The mobile phone 11 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the mobile phone 11. In some other embodiments of this application, the mobile phone 11 may include more or fewer components than those shown in the figure, or some components may be combined or split, or the components may be arranged in different manners. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The processor can generate an operation control signal based on an instruction operation code and a time sequence signal, to complete control of instruction reading and instruction execution.

The processor 110 may be further provided with a memory that is configured to store an instruction and data. In some embodiments, the memory in the processor 110 is a cache. The memory may store an instruction or data that has been used or repeatedly used by the processor 110. If the processor 110 needs to use the instruction or the data again, the processor 110 may directly invoke the instruction or the data from the memory. This avoids repeated access, and reduces waiting time of the processor 110, thereby improving system efficiency.

A wireless communication function of the mobile phone 11 may be implemented by using the antenna 1, the antenna 2, the mobile communication module 150, the wireless communication module 160, the modem processor, the baseband processor, and the like.

The mobile communication module 150 can provide a solution that is applied to the mobile phone 11 and that includes wireless communication such as 2G/3G/4G/5G.

The wireless communication module 160 may provide a wireless communication solution that is applied to the mobile phone 11, and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like.

In some embodiments, the antenna 1 and the mobile communication module 150 in the mobile phone 11 are coupled, and the antenna 2 and the wireless communication module 160 in the mobile phone 11 are coupled, so that the mobile phone 11 can communicate with a network and another device by using wireless communication technologies.

For example, the mobile phone 11 may establish a communication connection to the AP router 10 by using the wireless communication module 160.

The mobile phone 11 may implement a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute a program instruction to generate or change display information.

The display 194 is configured to display an image, a video, and the like. The display 194 includes a display panel. In some embodiments, the mobile phone 11 may include one or N displays 194, where N is a positive integer greater than 1.

The mobile phone 11 may display, by using the display 194, information such as the patch push message and the patch description information that are received by the mobile phone 11.

The internal memory 121 may be configured to store computer executable program code. The executable program code includes an instruction. The internal memory 121 may include a program storage area and a data storage area. The program storage area may store an operating system, an application program required for at least one function (for example, a sound play function or an image play function), and the like. The data storage area may store data (such as audio data and a phone book), and the like that are created during use of the mobile phone 11. In addition, the internal memory 121 may include a high-speed random access memory, and may further include a non-volatile memory, for example, at least one magnetic disk storage device, a flash memory device, or a universal flash storage (universal flash storage, UFS). The processor 110 runs an instruction stored in the internal memory 121 and/or an instruction stored in the memory disposed in the processor, to perform various function applications and data processing of the mobile phone 11. For example, an operation of the mobile phone 11 sending a patch query request and a patch obtaining request to the patch server 100 to obtain a reused patch package, and an operation of the mobile phone 11 installing a patch file and sending a patch file required by another device to another device are performed.

A structure of the another device on the device side is not described in detail in this application, and the structure may be various currently common structures.

Figure 4:
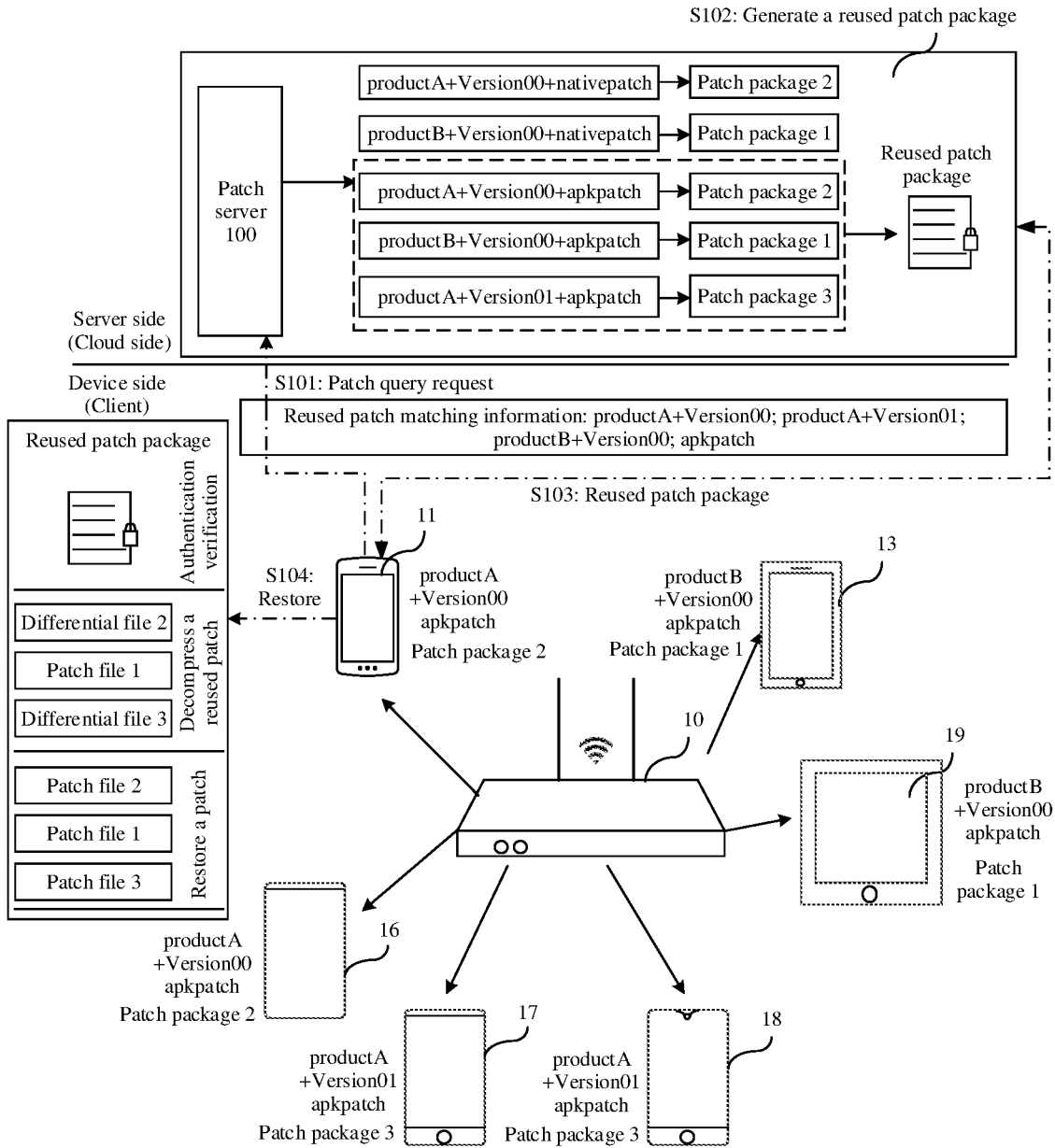
FIG. 4 shows an application scenario of a patch reuse method and a schematic flowchart of patch downloading and installing by a plurality of devices according to some embodiments of this application.

In another implementation of this application, the patch reuse method provided in this application may be applied to the system shown in FIG. 4. A server side of the system includes a patch server 100, and the patch server 100 stores several patch packages. A device side of the system is a device side corresponding to the foregoing home local area network 200, and the device side includes an AP router 10, and a mobile phone 11, a mobile phone 16, a mobile phone 17, a mobile phone 18, a tablet computer 13, and a tablet computer 19 that separately establish a communication connection to the AP router 10. The mobile phone 11, the mobile phone 16, the mobile phone 17, the mobile phone 18, the tablet computer 13, and the tablet computer 19 need to query a patch. In this case, the mobile phone 11, the mobile phone 16, the mobile phone 17, the mobile phone 18, the tablet computer 13, and the tablet computer 19 may be used as devices that can reuse a patch in the system, in addition, the mobile phone 11 is used as a reused patch downloading device.

The following describes in detail processes of querying, downloading, and installing a patch by the mobile phone 11, the mobile phone 16, the mobile phone 17, the mobile phone 18, the tablet computer 13, and the tablet computer 19.

Refer to FIG. 4. FIG. 4 shows the processes of querying, downloading, and installing a patch by the mobile phone 11, the mobile phone 16, the mobile phone 17, the mobile phone 18, the tablet computer 13, and the tablet computer 19, which include the following steps.

S101: The mobile phone 11, the mobile phone 16, the mobile phone 17, the mobile phone 18, the tablet computer 13, and the tablet computer 19 on the device side each have software on which a patch update needs to be performed, and the mobile phone 11 serves as a reused patch downloading device and sends a patch query request to the patch server 100, where the patch query request includes reused patch matching information corresponding to the mobile phone 11, the mobile phone 16, the mobile phone 17, the mobile phone 18, the tablet computer 13, and the tablet computer 19.

A process in which the mobile phone 11 determines the reused patch matching information includes that: after the mobile phone 11 receives a patch query instruction of a user, the mobile phone 11 separately sends a patch matching information obtaining request to the mobile phone 16, the mobile phone 17, the mobile phone 18, the tablet computer 13, and the tablet computer 19, so as to separately obtain patch matching information of the mobile phone 16, the mobile phone 17, the mobile phone 18, the tablet computer 13, and the tablet computer 19.

After the mobile phone 16, the mobile phone 17, the mobile phone 18, the tablet computer 13, and the tablet computer 19 receives the patch matching information obtaining request sent by the mobile phone 11, the mobile phone 16, the mobile phone 17, the mobile phone 18, the tablet computer 13, and the tablet computer 19 separately send their patch matching information to the mobile phone 11.

After the mobile phone 11 obtains the patch matching information of the mobile phone 16, the mobile phone 17, the mobile phone 18, the tablet computer 13, and the tablet computer 19, the mobile phone 11 determines the reused patch matching information based on the patch matching information of the mobile phone 16, the mobile phone 17, the mobile phone 18, the tablet computer 13, and the tablet computer 19, and the patch matching information of the mobile phone 11.

The patch matching information of each device includes a product type, a version number, and a patch type of the device. The product type may be, for example, productxx, the version number may be, for example, versionxx, and the patch type may be, for example, patchtype. The patch type may be used to indicate a capability of a reused patch of the device.

Generally, the version number versionxx may make the patch matching information unique. When a patch package is determined based on the patch matching information, the patch is distinguished by using the version number, so that only the patch package determined based on the patch matching information is determined.

In addition, in some scenarios, versionxx may further include information productxx to ensure that the patch matching information obtained by combining the product type and the version number is unique, so that only the patch package determined based on the patch matching information is determined.

As shown in FIG. 4, the patch matching information of the mobile phone 11 and the mobile phone 16 is productA+Version00; apkpatch. The patch matching information of the mobile phone 17 and the mobile phone 18 is: productA+Version01; apkpatch. The patch matching information of the tablet computer 13 and the tablet computer 19 is: productB+Version00; apkpatch.

The mobile phone 11 uses, based on the patch matching information of each device, a union set of each piece of the patch matching information as the reused patch matching information. Then the mobile phone 11 can determine that the reused patch matching information is: productA+Version00; productA+Version01; or productB+Version00; apkpatch.

After the mobile phone 11 determines the reused patch matching information, the mobile phone 11 sends a patch query request that includes the reused patch matching information to the patch server 100.

S102: After the patch server 100 on the server side receives the patch query request, the patch server 100 on the server side generates a reused patch package based on the reused patch matching information in the patch query request.

That the patch server 100 on the server side generates a reused patch package based on the reused patch matching information in the patch query request includes that: the patch server 100 restores, based on the reused patch matching information in the patch query request, the patch matching information, where the obtained patch matching information includes: "productA+Version00; apkpatch", "productA+Version01; apkpatch", and "productB+Version00; apkpatch".

Then, the patch server 100 selects, from a plurality of patch packages configured by the patch server 100, a patch package that matches each piece of the patch matching information. As shown in FIG. 4, the patch packages configured by the patch server 100 include a patch package 1 and a patch package 2 whose patch types are nativepatch, and a patch package 1, a patch package 2, and a patch package 3 whose patch types are apkpatch. In this case, the patch server 100 determines that a patch package matching the patch matching information "productA+Version00; apkpatch" is a patch package 2 whose patch type is apkpatch, and a patch package matching the patch matching information "productA+Version01; apkpatch" is a patch package 3 whose patch type is apkpatch, a patch package matching the patch matching information "productB+Version00; apkpatch" is a patch package 1 whose patch type is apkpatch.

Figure 5:
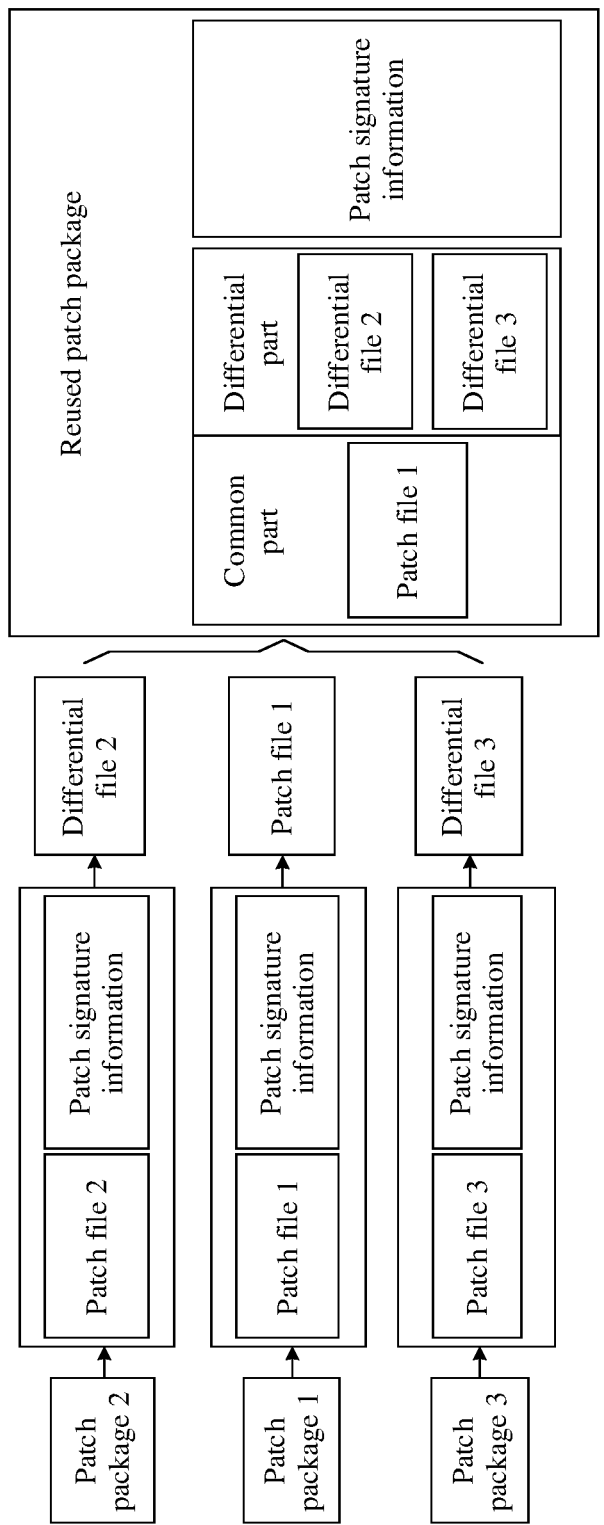
FIG. 5 is a schematic diagram of a process in which a patch server obtains a reused patch package according to some embodiments of this application.

As shown in FIG. 5, the patch package 1, the patch package 2, and the patch package 3 whose patch type is apkpatch in the patch server 100 include a corresponding patch file 1, patch file 2, and patch file 3 respectively, and patch signature information for performing signature protection on each patch file, where the patch signature information of each patch package is the same.

If the patch files of the patch package 1, the patch package 2, and the patch package 3 have a same part, differential package assembly performed by the patch server 100 based on the patch package 1, the patch package 2, and the patch package 3 to generate a reused patch package may be the patch server 100 obtaining a common (or reused) patch file of the patch package 1, the patch package 2, and the patch package 3, and packing different parts, where the common patch file is used as a common part (may also be referred to as a common package), and the different parts are used as a differential part (may also be referred to as a differential package). The common part and the differential part form a complete reused file, and then signature protection is performed on the reused file to obtain a reused patch package.

As shown in FIG. 5, a common part in the patch files of the patch package 1, the patch package 2, and the patch package 3 is a patch file 1 of the patch package 1, and therefore, the patch file 1 of the patch package 1 may be used as a common part. A different part in the patch file 2 of the patch package 2 is used as a differential file 2, and a different part in the patch file 3 of the patch package 3 is used as a differential file 3. The differential file 2 and the differential file 3 are packed and used as the differential part. The patch file of the reused patch package includes the patch file 1 of the patch package 1, and the differential file including the parts that are different in the patch package 2 and the patch package 3. The reused patch package further includes patch signature information, and signature information of the reused patch package is also the same as the patch signature information of the foregoing patch package 1, patch package 2, and patch package 3.

According to the patch reuse method provided in this implementation, the patch server 100 performs differential reassembly on the reused patch package that needs to be downloaded on the device side, uses a same part in a plurality of patch packages as a common part, and uses parts that are different in the plurality of patch packages as a differential part, so as to obtain the reused patch package that includes the common part and the differential part. A size of the reused patch package can be effectively reduced, so as to improve transmission efficiency of the reused patch package, reduce network resources that are occupied, and further reduce memory usage of the mobile phone 11 caused by the reused patch package.

In this implementation, the reused patch package may be transmitted in a form of an OAT data package, or certainly, may be transmitted in a data package in another format.

S103: The patch server boo on the server side delivers the reused patch package to the mobile phone 11.

That the patch server 100 delivers the reused patch package to the mobile phone 11 includes: after the patch server generates the reused patch package, directly delivering, by the patch server 100, the reused patch package to the mobile phone 11.

Alternatively, after the patch server 100 generates the reused patch package, the patch server 100 sends a patch push message to the mobile phone 11 to push the reused patch package. The patch push message includes patch description information (may also be referred to as patch introduction or patch update log information) of the reused patch package. For example, the patch description information may include brief descriptions of contents such as a name and an implemented function of the patch package 1, the patch package 2, and the patch package 3. After the mobile phone 11 receives the patch push message, if the mobile phone 11 detects an operation that a user confirms downloading the reused patch package, the mobile phone 11 sends a patch obtaining request to the patch server 100 to obtain the reused patch package. After the patch server 100 receives the patch obtaining request, the patch server 100 delivers the reused patch package to the mobile phone 11.

Figure 6:
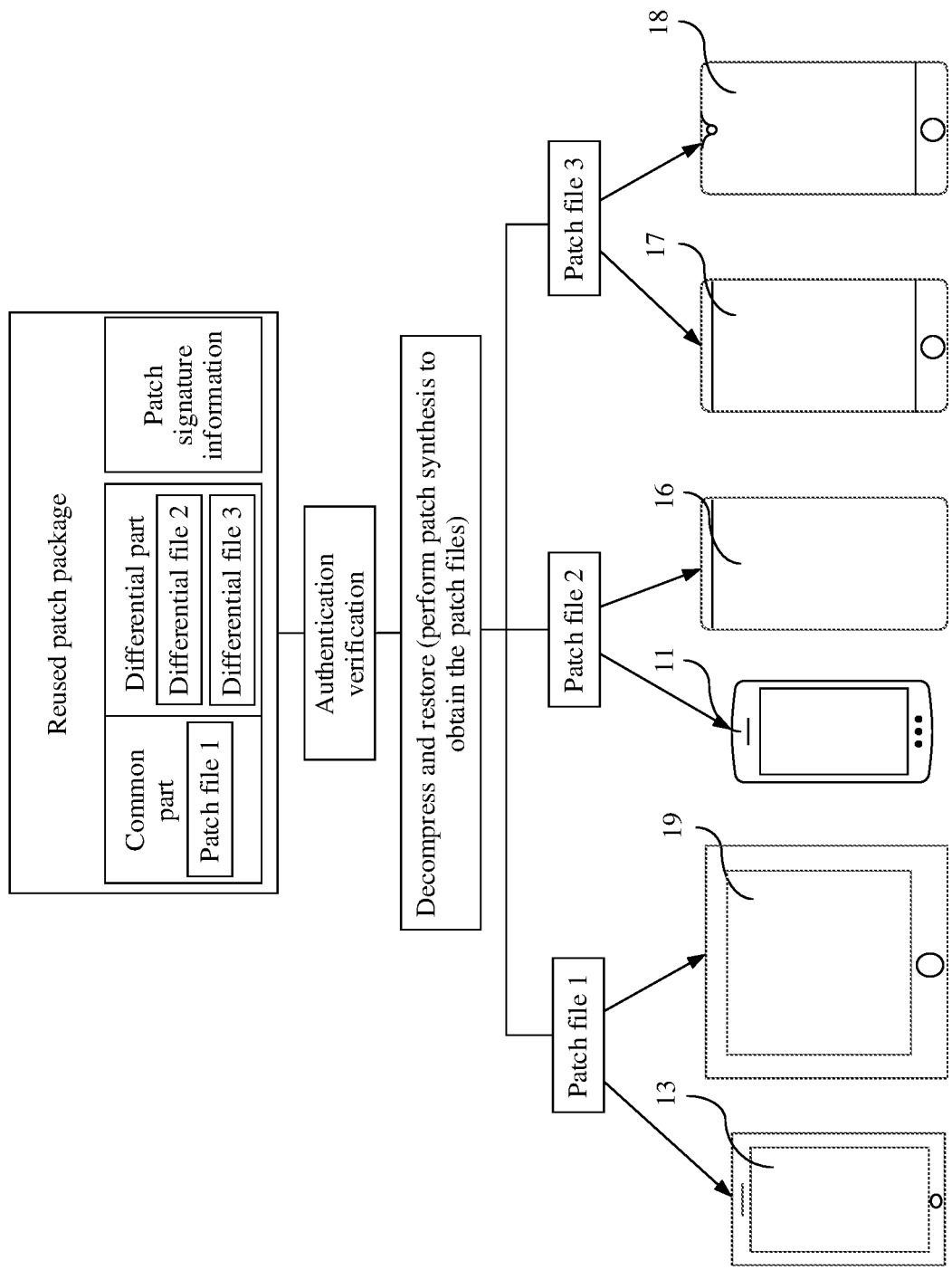
FIG. 6 is a schematic flowchart of a method for processing a reused patch package after a mobile phone 11 obtains the reused patch package according to some embodiments of this application.

S104: After the mobile phone 11 receives the reused patch package, as shown in FIG. 6 (or refer to FIG. 4), the mobile phone 11 performs authentication verification (may also be referred to as security verification) on the reused patch package based on the patch signature information of the reused patch package. After the verification succeeds, if it is determined that the reused patch package is a patch on which differential reassembly has been performed, the mobile phone 11 decompresses the reused patch package to obtain a patch file 1 used as a common part, and a differential file 2 and a differential file 3 that are used as differential parts. Then, the mobile phone 11 performs patch synthesis based on the patch file 1, the differential file 2, and the differential file 3 to separately restore the patch file 1 corresponding to the patch package 1, the patch file 2 corresponding to the patch package 2, and the patch file 3 corresponding to the patch package 3.

Still refer to FIG. 6. After the mobile phone 11 obtains the patch file 2 corresponding to the patch package 2, the mobile phone 11 installs the patch file 2 to complete patch installation.

In addition, the mobile phone 11 sends the patch file 2 corresponding to the patch package 2 to the mobile phone 16. After the mobile phone receives the patch file 2, the mobile phone 16 installs the patch file 2 to complete patch installation.

In this implementation, that the mobile phone 11 sends the patch file 2 to the mobile phone 16 may be that the mobile phone 11 directly sends the patch file 2 to the mobile phone 16 based on the patch matching information of the mobile phone 16. Alternatively, this may be also that the mobile phone 11 sends a patch broadcast message to all online devices in the home local area network 200 to broadcast the patch file 2. The patch broadcast message may include patch description information of the patch package 2 such as a patch name and a patch function (or the patch file 2). After the mobile phone 16 receives the patch broadcast message, if it is confirmed that the patch file 2 is downloaded, the mobile phone 16 sends a patch obtaining request to the mobile phone 11. After the mobile phone 11 receives the patch obtaining request, the mobile phone 11 sends the patch file 2 to the mobile phone 16.

The mobile phone 11 separately sends the patch file 3 corresponding to the patch package 3 to the mobile phone 17 and the mobile phone 18. After the mobile phone 17 and mobile phone 18 receive the patch file 3, the mobile phone 17 and the mobile phone 18 separately install the patch file 3 to complete patch installation.

The mobile phone 11 separately sends the patch file 1 corresponding to the patch package 1 to the tablet computer 13 and the tablet computer 19. After the tablet computer 13 and the tablet computer 19 receive the patch file 1, the tablet computer 13 and the tablet computer 19 separately install the patch file 1 to complete patch installation.

In this implementation, a process in which the mobile phone 11 sends the corresponding patch file to the mobile phone 17, the mobile phone 18, the tablet computer 13, and the tablet computer 19 is similar to the foregoing process in which the mobile phone 11 sends the patch file 2 to the mobile phone 16, and details are not described herein again.

According to the patch reuse method provided in this implementation, when a plurality of devices that belong to the same home local area network 200 on the device side need to download and install a patch, one of the devices may be used as a reused patch downloading device to collectively obtain patch files required by the devices from the patch server 100 on the server side. Then, the patch file is sent to the corresponding device, so that each device completes patch installation. This avoids the problem that the plurality of devices separately download the patch from the server side, and effectively improves patch installation efficiency.

In addition, after the mobile phone 11 that is used as the reused patch downloading device obtains the reused patch package, and then performs authentication verification and restoration on the reused patch package to obtain each patch file, the mobile phone 11 may directly send the obtained patch file on which authentication verification and decompression are performed to each device, so that each device can directly perform patch installation based on the patch file, and authentication verification and decompression do not need to be performed on the patch package. This effectively improves patch installation efficiency.

For step S101 in this implementation, the mobile phone 16, the mobile phone 17, the mobile phone 18, the tablet computer 13, and the tablet computer 19 are online devices in the home local area network 200, and the online device in the home local area network 200 may be considered as a device that needs to perform a patch query. In this way, after the mobile phone receives a patch query instruction of a user, the mobile phone 11 separately sends a patch matching information obtaining request to the mobile phone 16, the mobile phone 17, the mobile phone 18, the tablet computer 13, and the tablet computer 19, so as to separately obtain patch matching information of the mobile phone 16, the mobile phone 17, the mobile phone 18, the tablet computer 13, and the tablet computer 19. If there is another online device in the home local area network 200, the mobile phone 11 also sends the patch matching information obtaining request to the another device.

In another implementation of this application, for step S101 in this implementation, the online device in the home local area network 200 may also send the patch query request to the mobile phone 11 based on a separate patch query period, so as to send the patch matching information. After the mobile phone 11 receives the patch query request sent by the another device, the mobile phone 11 sends the patch query request to the patch server 100. Alternatively, after the mobile phone 11 receives the patch query instruction of the user, the mobile phone 11 may directly generate, based on the received patch matching information of the another device and the matching information of the mobile phone 11, the patch obtaining request that includes the reused patch matching information. In addition, the mobile phone 11 may also send the patch query request to the patch server 100 based on a preset patch query period. In this application, the patch query period may be one hour, or any time such as one day or one week, and may be set as required.

In another implementation of this application, if a patch query period of the online device (for example, the mobile phone 16, the mobile phone 17, the mobile phone 18, the tablet computer 13, and the tablet computer 19) in the home local area network 200 is longer than a common patch update period (that is, a period in which the patch server 100 releases a patch), the online device in the home local area network 200 sends the patch query request to the mobile phone 11, and may further initiate an online patch query request to the patch server 100, so as to obtain the patch information separately from the home local area network 200 and the patch server 100. When a version of the patch obtained from the mobile phone 11 is later than a version of the patch obtained from the patch server 100, the online device obtains the patch from the mobile phone 11.

Figure 7:
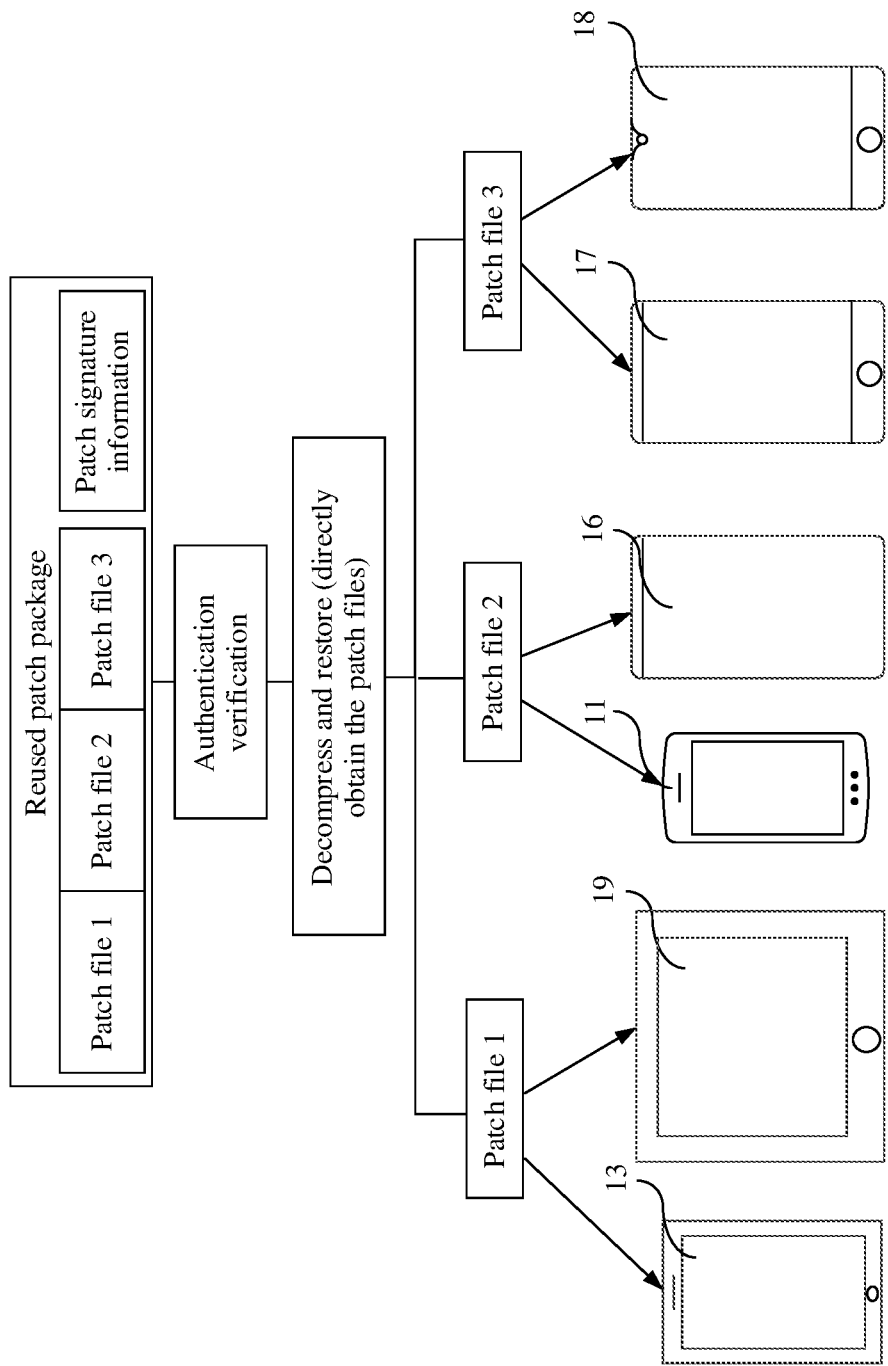
FIG. 7 is a schematic flowchart of another method for processing a reused patch package after a mobile phone 11 obtains the reused patch package according to some embodiments of this application.

For step S102 in this implementation, after the patch server 100 receives the patch query request, when the patch server 100 generates the reused patch package based on the reused patch matching information in the patch query request, if there is no common part in the patch package 1, the patch package 2, and the patch package 3, the patch server 100 may directly form the reused patch package shown in FIG. 7 based on the patch file 1, the patch file 2, and the patch file 3. The reused patch package includes the patch file 1, the patch file 2, the patch file 3, and the patch signature information. Correspondingly, for step S104, after the mobile phone 11 receives the reused patch package, a process in which the mobile phone 11 restores the patch based on the reused patch package may be that the mobile phone 11 performs authentication verification on the reused patch package. After the authentication verification succeeds, if it is determined that the reused patch package is a patch on which no differential reassembly is performed, the patch file 1, the patch file 2, and the patch file 3 are directly obtained based on the reused patch package.

It should be noted that, in this implementation, a process in which the patch server 100 generates the reused patch package corresponding to the mobile phone 11, the mobile phone 16, the mobile phone 17, the mobile phone 18, the tablet computer 13, and the tablet computer 19, and a process in which the mobile phone 11 obtains, based on the reused patch package, the reused patch package corresponding to the mobile phone 11, the mobile phone 16, the mobile phone 17, the mobile phone 18, the tablet computer 13, and the tablet computer 19 are the same as a process in which the patch server 100 generates the reused patch package corresponding to the mobile phone 11, the mobile phone 15, the device 202, the bracelet 101, and the large-screen device 14, and a process in which the mobile phone 11 obtains, based on the reused patch package, the patch corresponding to the mobile phone 11, the mobile phone 15, the device 202, the bracelet 101, and the large-screen device 14.

Figure 8A:
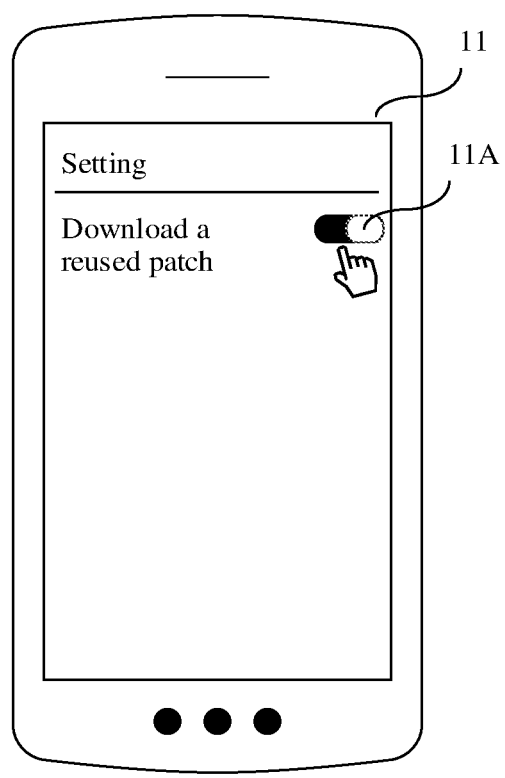
FIG. 8A to FIG. 8D are schematic diagrams of some display interfaces of a mobile phone 11 according to some embodiments of this application.

In an implementation of this application, after the mobile phone accesses the home local area network 200, the mobile phone 11 may display a display interface shown in FIG. 8A. A setting control of the mobile phone 11 includes a "Download a reused patch" control 11A. If the mobile phone 11 detects a start operation performed by a user on the "Download a reused patch" control 11A, during use of the mobile phone 11, the mobile phone 11 that is used as the reused patch downloading device may obtain the reused patch package based on the preset patch query period as described above, or obtain the reused patch package after the mobile phone 11 receives the patch query instruction of the user. Certainly, after the mobile phone 11 accesses the home local area network 200, the mobile phone 11 may not display the display interface shown in FIG. 8A. When the user opens the setting control as required, the mobile phone 11 displays the display interface shown in FIG. 8A.

Figure 8B:
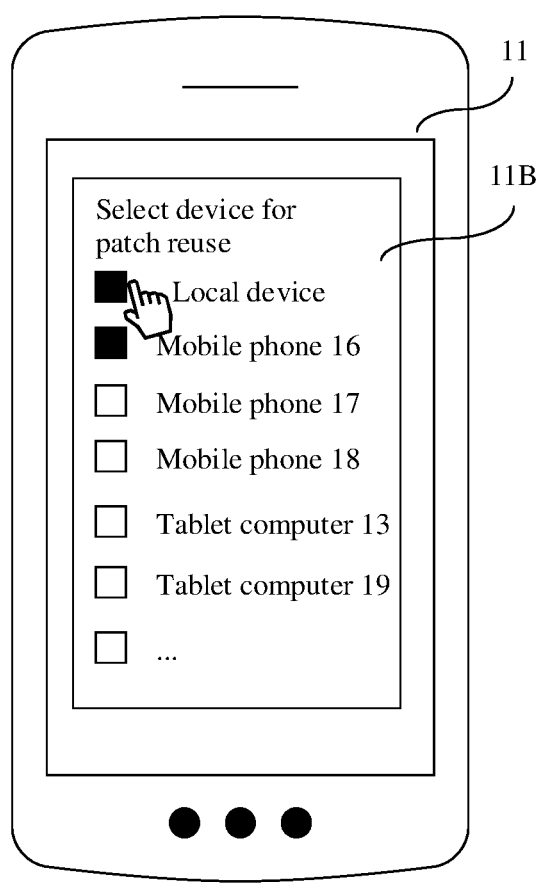

In addition, if the mobile phone 11 detects a start operation performed by the user on the "Download a reused patch" control 11A, the mobile phone 11 may further display the display interface shown in FIG. 8B, where the display interface includes a "Select device for patch reuse" control 11B used by the user to select a device on which a patch can be reused, the user can click a name of each device or a check box before the name to select the device that reuses the patch.

Figure 8C:
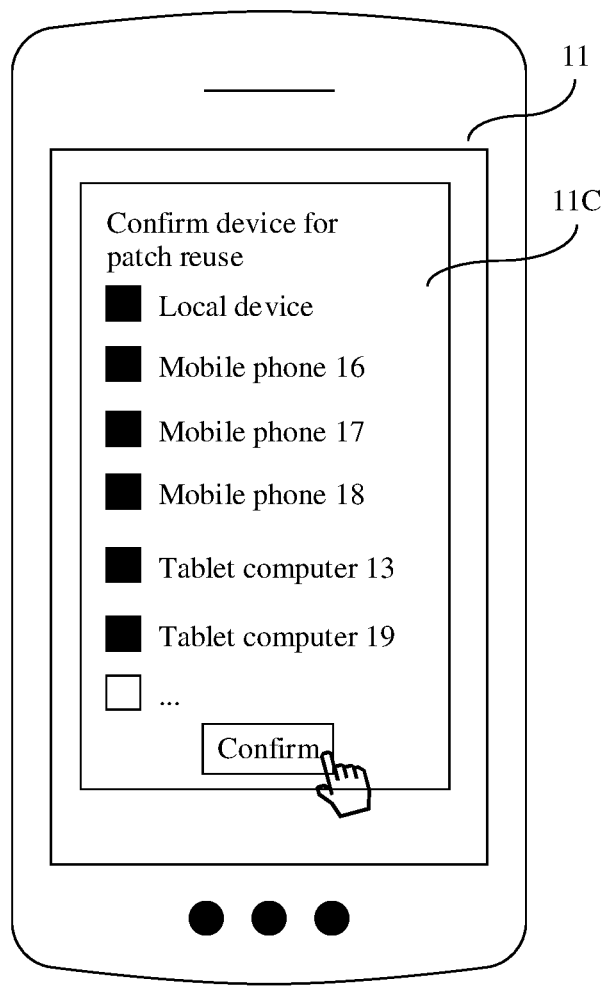

Certainly, the mobile phone 11 may also automatically determine, based on a type of the device in the home local area network 200, a device that can reuse a patch for the user to confirm. For example, as shown in FIG. 8C, after the mobile phone 11 determines a device on which the patch can be reused, the mobile phone 11 displays a "Confirm device for patch reuse" control 11C. If the user clicks "Confirm", the mobile phone 11 determines that the devices that can reuse the patch include the mobile phone 11, the mobile phone 16, the mobile phone 17, the mobile phone 18, the tablet computer 13, and the tablet computer 19, and the mobile phone 11 sends a patch obtaining request to the patch server 100. In addition, the user can click the name of each device or the check box before the name to select the device that reuses the patch.

Figure 8D:
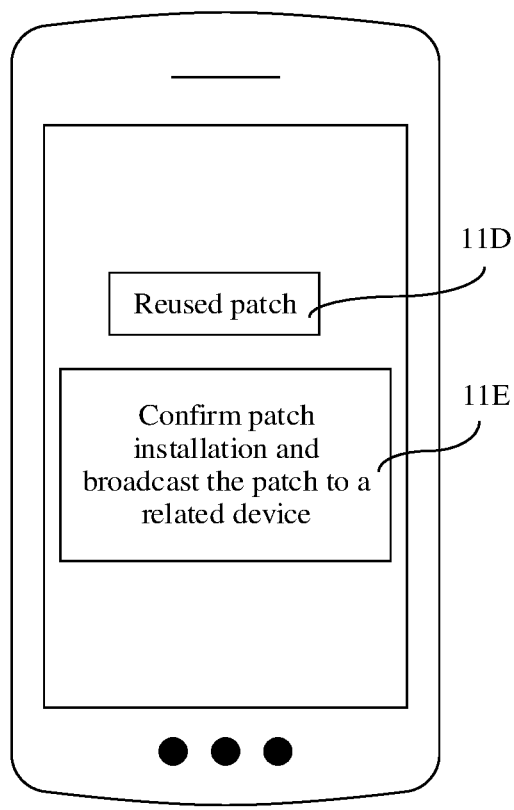

After the mobile phone receives the reused patch package sent by the patch server 100, the mobile phone 11 may display the display interface shown in FIG. 8D. The display interface includes prompt information 11D "Reused patch" and a control 11E "Confirm patch installation and broadcast the patch to a related device". If the mobile phone 11 detects a trigger operation performed by the user on the control 11E "Confirm patch installation and broadcast the patch to a related device", the mobile phone 11 obtains the foregoing patch file 1, patch file 2, and patch file 3 based on the reused patch package. In addition, the mobile phone installs the patch file 2, and broadcasts the patch file 1, the patch file 2, and the patch file 3 to the mobile phone 16, the mobile phone 17, the mobile phone 18, the tablet computer 13, and the tablet computer 19 in the home local area network 200. Certainly, the mobile phone 11 may also broadcast the patch file 1, the patch file 2, and the patch file 3 to another device in the home local area network 200.

Figure 9A:
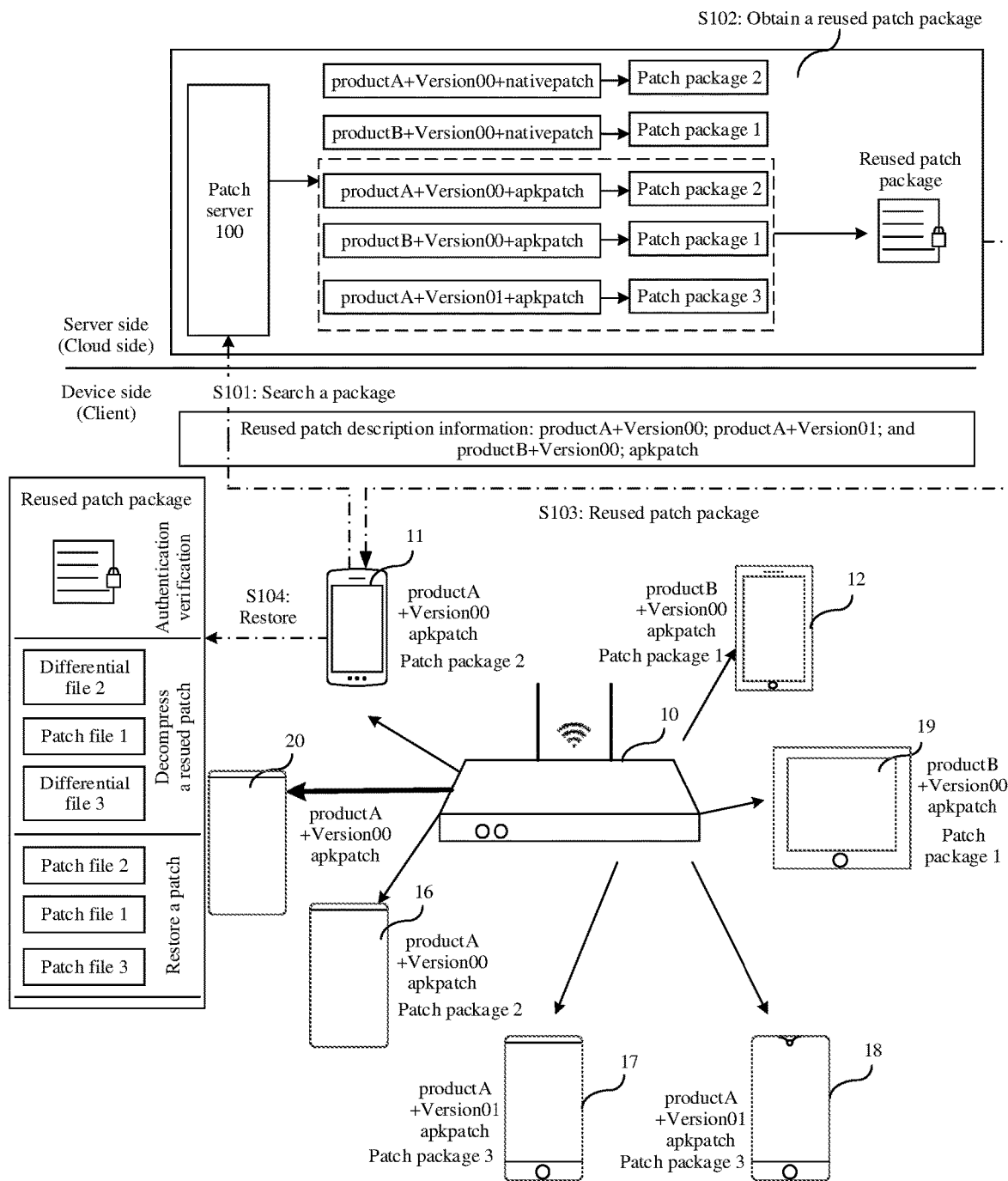
FIG. 9A shows an application scenario of another patch reuse method according to some embodiments of this application.

Refer to FIG. 9A, In another implementation of this application, the mobile phone 20 that is used as a newly added device accesses the AP router 10, and establishes a communication connection to the AP router 10. That is, the home local area network 200 includes the mobile phone 20 that is used as a newly added device. If the mobile phone 20 needs to query, download, and install a patch, the mobile phone 20 may first query and search in the home local area network 200 to determine whether there is a patch that needs to be downloaded by the mobile phone 20. If the mobile phone 20 finds, through query in the home local area network 200, a patch that needs to be downloaded, the mobile phone 20 downloads, from the home local area network 200, the patch that needs to be downloaded, and installs the patch. If the mobile phone 20 does not find, through query in the home local area network 200, a patch that needs to be downloaded, the mobile phone 20 queries, in the patch server 100, whether there is a patch that needs to be downloaded.

Figure 9B:
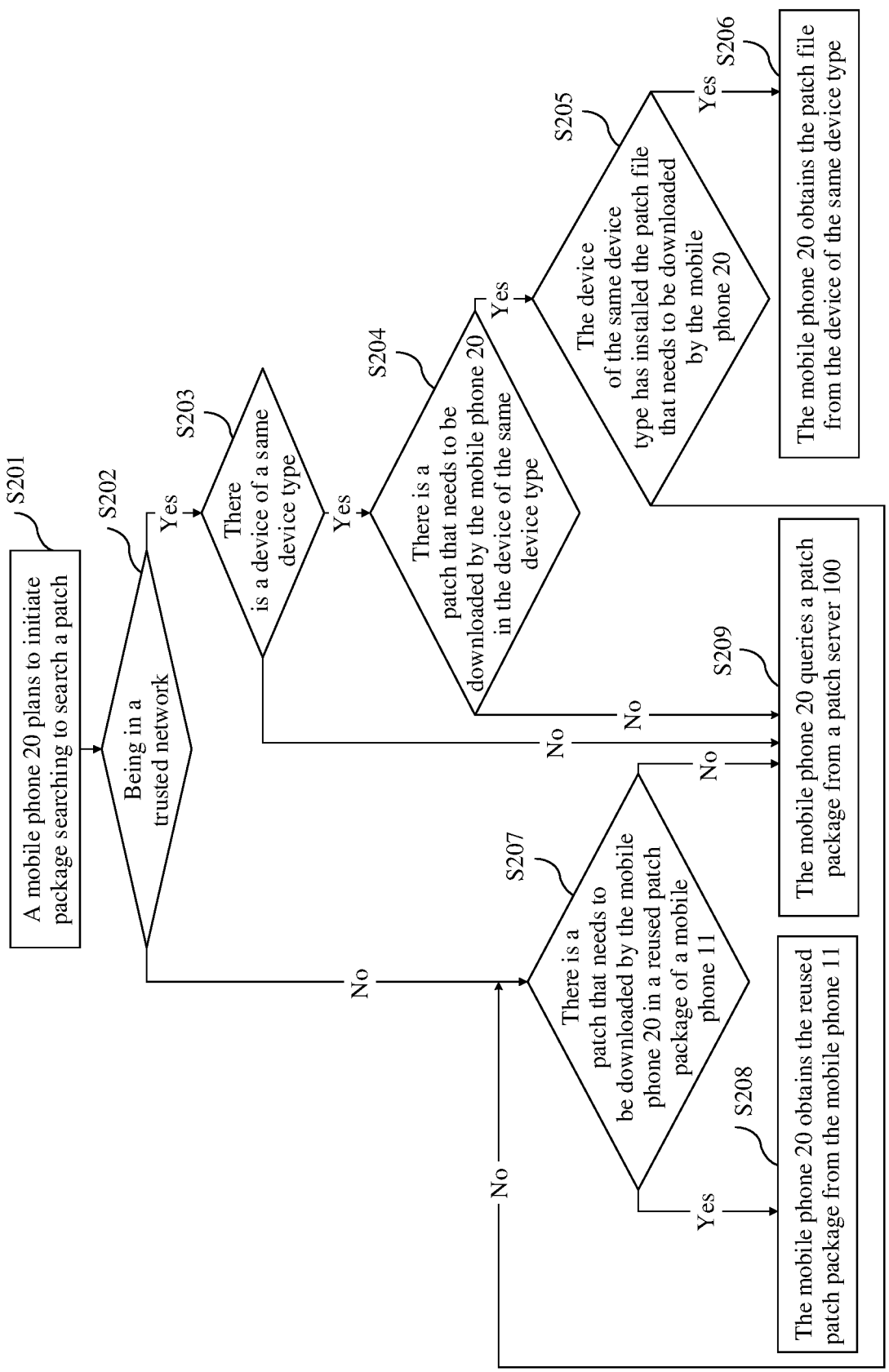
FIG. 9B is a schematic flowchart of downloading and installing a patch by a mobile phone 20 that newly joins a home local area network 200 according to some embodiments of this application.

Refer to FIG. 9B. FIG. 9B shows a process of querying, downloading, and installing a patch by the mobile phone 20 may include the following steps.

S201: After the mobile phone 20 accesses the AP router 10, that is, the mobile phone 20 accesses the home local area network 200, the mobile phone 20 receives a patch query instruction from a user, and plans to initiate a patch package search to query and search for a patch.

That the mobile phone 20 receives a patch query instruction may be that after the mobile phone 20 accesses the home local area network 200, the mobile phone 20 displays a display interface that includes a "Search to update" control. If the mobile phone 10 detects a trigger operation performed by a user on the "Search to update" control, the mobile phone 20 receives the patch query instruction.

S202: The mobile phone 20 obtains a network identifier of a currently accessed home local area network 200, and performs trusted network verification, to determine whether the home local area network 200 is a trusted network of the mobile phone 20. If the home local area network 200 is a trusted network of the mobile phone 20, S203 is performed; or if the home local area network 200 is not a trusted network of the mobile phone 20, S207 is performed.

A trusted network may be established by using the AP router 10 as an identifier. After the mobile phone 20 joins the home local area network 200 that is provided by the AP router 10 for the first time, the mobile phone 20 identifies the current home local area network 200 as a trusted network, and information (for example, a trusted network identifier) of the trusted networks is stored on the AP router 10 and the mobile phone 20. After the mobile phone 20 accesses the home local area network 200 that is provided by the AP router 10 again, the mobile phone 20 obtains a trusted network identifier from the AP router 10, and matches the trusted network identifier with a trusted network identifier that is stored in the mobile phone 20. If the trusted network identifiers are consistent, the mobile phone 20 considers that the accessed home local area network 200 is a trusted network, if the network identifiers are inconsistent, the mobile phone 20 considers that the accessed home local area network 200 is an untrusted network.

That the home local area network 200 is a trusted network of the mobile phone 20 may also imply that the mobile phone 20 is a trusted network device in the home local area network 200.

After the verification on the trusted network succeeds, efficiency of obtaining the patch by the mobile phone 20 in the trusted network is higher than efficiency of obtaining the patch from the patch server 100 by using the WLAN network, and efficiency of obtaining the patch by the mobile phone 20 from the patch server 100 by using the WLAN network is higher than efficiency of obtaining the patch by the mobile phone 20 from the patch server 100 by using the mobile data network.

S203: The mobile phone 20 obtains a device type of each device in the home local area network 200, and determines whether a device that belongs to a same device type as the mobile phone 20 exists in the home local area network 200. If there is a device that belongs to the same device type as the mobile phone 20 in the home local area network 200, for example, the device that belongs to the same device type as the mobile phone 20 is the mobile phone 11, the mobile phone 16, the mobile phone 17, or the mobile phone 18, step S204 is performed. If there is no device that belongs to the same device type as the mobile phone 20 in the home local area network 200, step S209 is performed.

That the mobile phone 20 obtains a device type of each device in the home local area network 200 may be sending device type obtaining information to each device in the home local area network 200. After each device receives a device type obtaining request that is sent by the mobile phone 20, each device separately sends a device type of each device to the mobile phone 20. Then, the mobile phone 20 matches a device type of the mobile phone 20 with the obtained device type of each device, to determine a device that is in the home local area network 200 and that belongs to the same device type as the mobile phone 20. For example, if the device type of the mobile phone 20 is productA, a device of the same device type as the mobile phone 20 includes the mobile phone 11, the mobile phone 16, the mobile phone 17, or the mobile phone 18.

S204: The mobile phone 20 obtains version numbers of patches whose product types are productA in the mobile phone 11, the mobile phone 16, the mobile phone 17, and the mobile phone 18 that are the same device type, and performs version matching with version numbers in the patch matching information of the mobile phone 20, so as to determine whether there is a patch that needs to be downloaded by the mobile phone 20 in the device of the same device type. If a patch that has the same version number is matched, the mobile phone 20 performs S205. If no patch that has the same version number is matched, the mobile phone 20 performs S209.

The patch matching information of the mobile phone 20 may be, for example, productA+Version00; apkpatch. In this way, the mobile phone 20 determines that in the mobile phone 11, the mobile phone 16, the mobile phone 17, and the mobile phone 18 that are of the same device type as the mobile phone 20, there is a patch file 2 corresponding to the version number and the software version of the patch that needs to be obtained by the mobile phone 16 in the mobile phone 11 and the mobile phone 16.

S205: The mobile phone 20 determines whether the corresponding patch file 2 has been installed on devices that are of a same type and that have patches of a same version number. If the corresponding patch file 2 has been installed on devices that are of a same type and that have patches of a same version number, the mobile phone 20 performs S206; or if the corresponding patch file 2 has not been installed on devices that are of a same type and that have patches of a same version number, the mobile phone 20 performs S207.

S206: The mobile phone 20 obtains the patch file 2 from the device that of the same type and that has installed the patch file 2, and installs the patch file 2.

For example, if the mobile phone 16 has installed the patch file 2, it indicates that the patch file 2 can be successfully installed by the mobile phone 16, and the mobile phone 20 sends a patch obtaining request to the mobile phone 16 to obtain the patch file 2. If the mobile phone 11 has installed the patch file 2, the mobile phone 20 sends the patch obtaining request to the mobile phone 11 to obtain the patch file 2. If both the mobile phone 11 and the mobile phone 16 have installed the patch file 2, the mobile phone 20 may send the patch obtaining request to the mobile phone 11 or the mobile phone 16 as required, so as to obtain the patch file 2 that may be selected as required.

For the mobile phone 16 in the home local area network 200, the mobile phone 16 may determine whether the mobile phone 16 is in a trusted network. If the mobile phone 16 is in the trusted network, the mobile phone 16 displays the patch file 2 of the patch package 2 corresponding to the mobile phone 16 in the home local area network 200 in a file-visible manner, the patch file 2 is displayed to the device that searches the package during searching.

After the mobile phone 20 initiates package searching, the mobile phone 20 preferentially searches for a device with a same device attribute in one network. The mobile phone 20 can find the patch file 2 that is exposed by the mobile phone 16, and finds that productxx and versionxx attributes of the patch in the mobile phone 16 are the same as those of the mobile phone 20. In this case, the mobile phone 20 directly synchronizes the patch file 2 of the patch package 2 in the mobile phone 16, and performs installation. The mobile phone 16 may directly obtain the patch file 2 to perform patch installation, and does not need to perform patch authentication verification and decompression, thereby effectively improving patch installation efficiency.

Figure 9C:
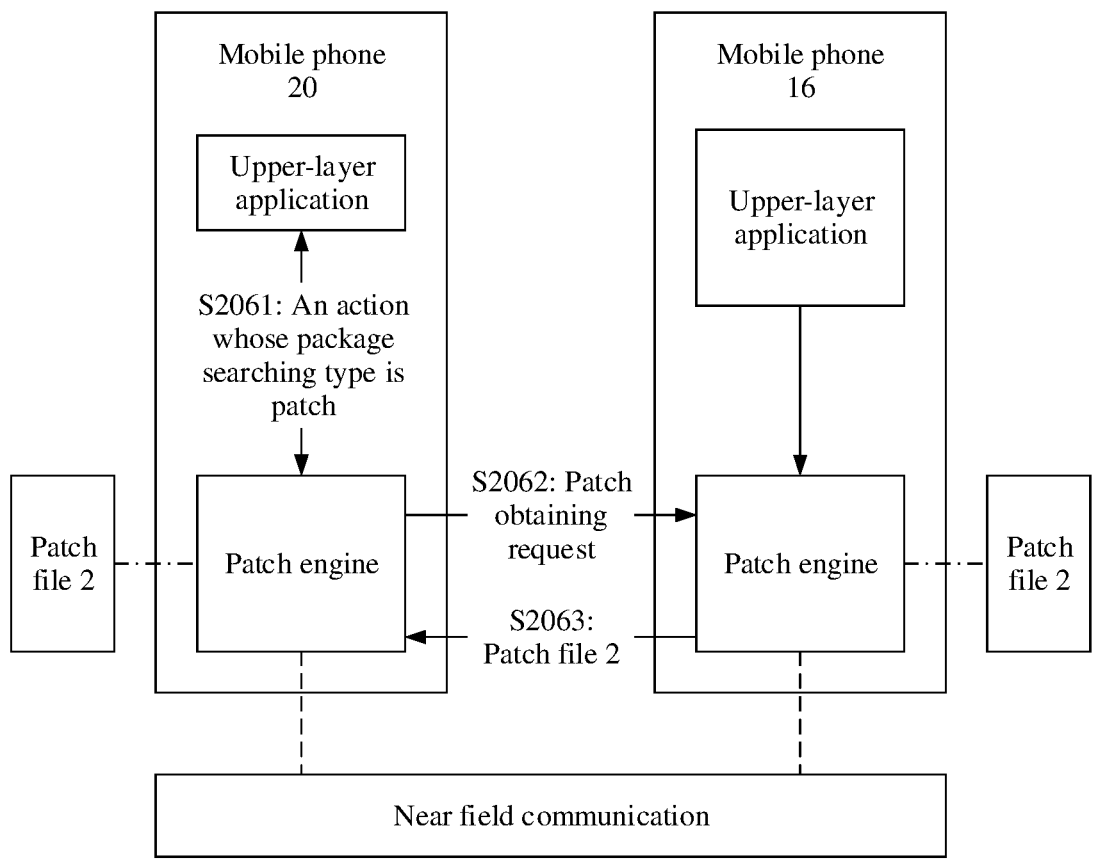
FIG. 9C is a schematic diagram of a specific process in which a mobile phone 20 downloads a patch according to some embodiments of this application.

Refer to FIG. 9C. In an implementation of this application, the process in which the mobile phone 20 obtains the patch file 2 on the mobile phone 16 includes the following steps.

S2061: When the mobile phone 20 searches for a patch in the mobile phone 16, an upper-layer application (that is, software) on which a patch update needs to be performed and that is in the mobile phone 20 initiates an action whose package searching type is patch to a patch engine.

S2062: The patch engine in the mobile phone 20 generates a patch obtaining request based on the action whose package searching type is a patch, where the patch obtaining request includes patch matching information of the upper-layer application on which the patch update needs to be performed and that is in the mobile phone 20. In addition, the mobile phone 20 sends the patch obtaining request to the patch engine in the mobile phone 16 based on near field communication by using the home local area network 200.

S2063: After the patch engine in the mobile phone 20 receives the patch obtaining request, the patch engine in the mobile phone 20 determines, based on the patch matching information, that the patch file of the patch corresponding to the patch matching information in the mobile phone 16 is the patch file 2. In addition, the mobile phone 16 sends the patch file 2 in the mobile phone 16 to the patch engine in the mobile phone 20 based on near field communication.

According to the patch reuse method provided in this implementation, devices that belong to the same trusted network may perform patch reuse by using patch matching information of another device in the network. For example, before the device in the home local area network 200 initiates a query and search for a patch, patches of the same device type and version number in the same home local area network 200 are preferentially synchronized, so as to avoid repeated package search.

In this implementation, when there is an offline device in a multi-device home local area network 200, for example, when the patch update is performed on a device in the home local area network 200 and the mobile phone 20 is offline, the mobile phone 20 misses a patch reuse process. After the mobile phone 20 goes online again, the mobile phone 20 still needs to search for and download a package again. In this implementation, after the mobile phone is connected to a trusted multi-device home local area network 200, the mobile phone 20 can quickly synchronize the patch, so as to avoid downloading the patch from the patch server 100 again. According to the patch reuse method provided in this implementation, a newly added device in a local area network can quickly upgrade a patch by using a feature that some devices are online for a long time, so as to implement quick patch installation.

S207: The mobile phone 20 queries whether the reused patch package in the mobile phone 11 includes a patch that needs to be downloaded by the mobile phone 20. If the reused patch package in the mobile phone 11 includes a patch that needs to be downloaded by the mobile phone 20, the mobile phone 20 performs S208; or if the reused patch package in the mobile phone 11 does not includes a patch that needs to be downloaded by the mobile phone 20, the mobile phone 20 performs S209.

That the mobile phone 20 determines whether the reused patch package in the mobile phone 11 includes the patch that needs to be downloaded by the mobile phone 20 may be that the mobile phone 20 obtains patch matching information to determine patch matching information of each reusable patch in the reused patch matching information, and performs matching with the patch matching information in the mobile phone 20. If there is same patch matching information, it is considered that the reused patch package in the mobile phone 11 includes the patch that needs to be downloaded by the mobile phone 20. If there is no same patch matching information, it is considered that the reused patch package in the mobile phone 11 does not include the patch that needs to be downloaded by the mobile phone 20.

S208: The mobile phone 20 sends the patch obtaining request to the mobile phone 11, obtains the reused patch package from the mobile phone 11, obtains the patch file 2 based on the reused patch package in the process shown in step S104, and installs the patch file 2.

That the patch obtaining request sent by the mobile phone 20 to the mobile phone 11 is that: the mobile phone 20 initiates an action for researching a package of productA+Version00+apkpatch, and the mobile phone 20 converts a searched package of apkpatch into a searched package of update.zip based on productA+Version00+apkpatch. In this case, the patch query request may be productA+Version00+update.zip. The type of the patch corresponding to Apkpatch is an apk data package, and the type of the patch corresponding to update.zip is an OAT data package. In this case, the mobile phone 20 may obtain the reused patch package whose data packet type is an OAT type.

After the mobile phone 20 obtains the reused patch package, the mobile phone 20 needs to perform authentication verification and decompression to obtain the patch file 2 corresponding to the patch package 2 required by the mobile phone 20, and then the mobile phone 20 installs the patch file 2.

For the mobile phone 11 in the home local area network 200, the mobile phone 11 may determine whether the mobile phone 11 is in a trusted network. If the mobile phone 11 is in the trusted network, the mobile phone 11 displays the patch file 1, the patch file 2, and the patch file 3 that are obtained in the mobile phone 11 based on the reused patch package on the home local area network 200 in a file-visible manner, the patch file 1, the patch file 2, and the patch file 3 are displayed to the device that searches the package in a package searching process of another device in the home local area network 200.

After the newly added device in the home local area network 200 initiates package searching, the newly added device in the home local area network 200 preferentially searches for a device with a same device attribute in one network, and can find the patch file exposed by the mobile phone 11. In this case, the newly added device may directly synchronize the patch file that needs to be downloaded in the mobile phone 11, and install the patch file, so as to improve patch installation efficiency.

S209: If there is no patch that needs to be downloaded by the mobile phone 20 in the home local area network 200, the mobile phone 20 may query and download the patch from the patch server 100.

A process in which the mobile phone 20 queries and downloads the patch from the patch server 100 includes that the mobile phone 20 sends a patch query request to the patch server 100. The patch query request includes patch matching information, where the patch matching information includes a product type of the mobile phone 20, a version number of software that needs to perform a patch query in the mobile phone 20, and a patch type of the required patch. The patch matching information may be productxx+Versionxx; apkpatch.

After the patch server 100 receives the patch query request, the patch server 100 performs authentication on the mobile phone 20 based on the product type of the mobile phone 20 in the patch query request. If the patch server 100 determines, based on the product type of the mobile phone 20, that the patch server 100 has a patch package corresponding to the mobile phone 20, the authentication that is performed by the patch server 100 on the mobile phone 20 succeeds. Then, the patch server 100 determines, based on the version number, that the patch corresponding to software of this version includes the patch package 2. The patch server 100 sends a patch push message for pushing the patch package 2 to the mobile phone 20, where the patch push message includes brief descriptions of contents such as a name of the patch package 2, a function implemented by the patch package 2, and the like.

After the mobile phone 20 receives the patch push message, if the mobile phone 20 detects an operation that a user confirms downloading the patch package 2, the mobile phone 20 sends a patch obtaining request for downloading the patch package 2 to the patch server 100. The patch server 100 delivers the patch package 2 to the mobile phone 20 based on the patch obtaining request. The patch package 2 includes the patch file 2 and patch signature information for performing security processing on the patch file 2, and the patch signature information is patch security-related packaging.

Certainly, in another implementation of this application, if the mobile phone 20 does not find a corresponding patch in the home local area network 200, the mobile phone 20 may no longer perform a patch query operation, or after a preset time interval (for example, 0.5 h or 1 h), the mobile phone 20 performs the foregoing step S201.

For the foregoing steps S207 and S208, the mobile phone 20 determines whether the reused patch package in the mobile phone 11 includes the patch that needs to be downloaded by the mobile phone 20. In another implementation of this application, the mobile phone 11 may also determine whether the reused patch package includes the patch that needs to be downloaded by the mobile phone 20. A determining process may be that the mobile phone 20 sends the patch query request to the mobile phone 11, where the patch query request includes the patch matching information of the mobile phone 20. If the mobile phone 11 determines, based on the patch matching request sent by the mobile phone 20, that the reused patch matching information includes the patch matching information of the mobile phone 20, it may be considered that the reused patch package includes the patch corresponding to the mobile phone 20, and the mobile phone 11 sends the reused patch package to the mobile phone 20. The mobile phone 20 receives the reused patch package, and obtains and installs the patch file corresponding to the mobile phone 20 based on the reused patch package.

In another implementation of this application, the mobile phone 20, as a newly added device, accesses the AP router 10. If the mobile phone 20 needs to query, download, and install a patch, the mobile phone 20 may query and search, in the home local area network 200, whether there is the patch that needs to be downloaded by the mobile phone 20, and query, from the patch server 100, whether there is the patch that needs to be downloaded by the mobile phone 20. If the mobile phone 20 determines that there is the patch that needs to be downloaded by the mobile phone 20 in both the home local area network 200 and the patch server 100, the mobile phone 20 may select a later patch (that is, the patch is released later, a patch function is more complete, or a patch version is later) to download and install the patch. For example, if there is a later patch in the home local area network 200, the mobile phone 20 downloads the patch from the home local area network 200. If there is a later patch in the patch server 100, the mobile phone 20 downloads the patch from the patch server 100.

According to the patch reuse method provided in this implementation, the home local area network 200 may provide a trusted patch source for the device in the home local area network 200. When there is a newly added device in the home local area network 200, the newly added device may search in the home local area network 200 for a patch that needs to be downloaded by the newly added device. If there is the patch that needs to be downloaded by the newly added device, the newly added device may directly obtain the patch that needs to be downloaded from the system, and does not need to download the patch from the patch server 100. In addition, a device outside the trusted network may perform patch reuse on the patch of the device inside the trusted network, so as to implement patch installation. For example, if the mobile phone 20 is not added to the trusted network home local area network 200, the trusted patch source package (that is, the patch file) in the home local area network 200 cannot be opened to the mobile phone 20, but the original reused patch package may be distributed to the newly added device through the trusted channel. This helps quickly fix untrusted devices in the home local area network 200.

Figure 10A:
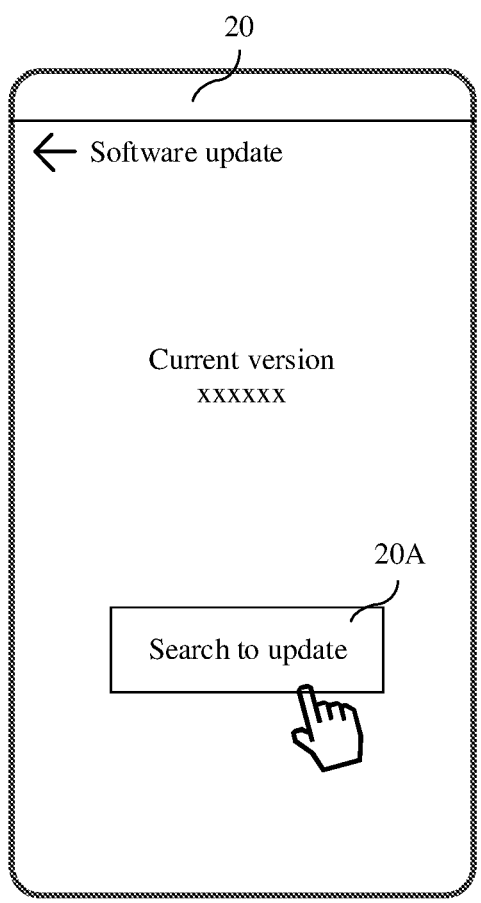
FIG. 10A to FIG. 10C are schematic diagrams of some display interfaces of a mobile phone 20 according to some embodiments of this application.

In this implementation, the "Search to update" control displayed by the mobile phone 20 may be the "Search to update" control 20A shown in FIG. 10A. If the mobile phone 20 detects a tap operation performed by the user on a "Software update" control of application software under the "Setting" control, an interface shown in FIG. 10A may be displayed.

In this implementation, if the mobile phone 20 detects a tap operation performed by the user on the "Search to update" control 20A, the mobile phone 20 performs patch search to search for a to-be-installed patch.

Figure 10B:
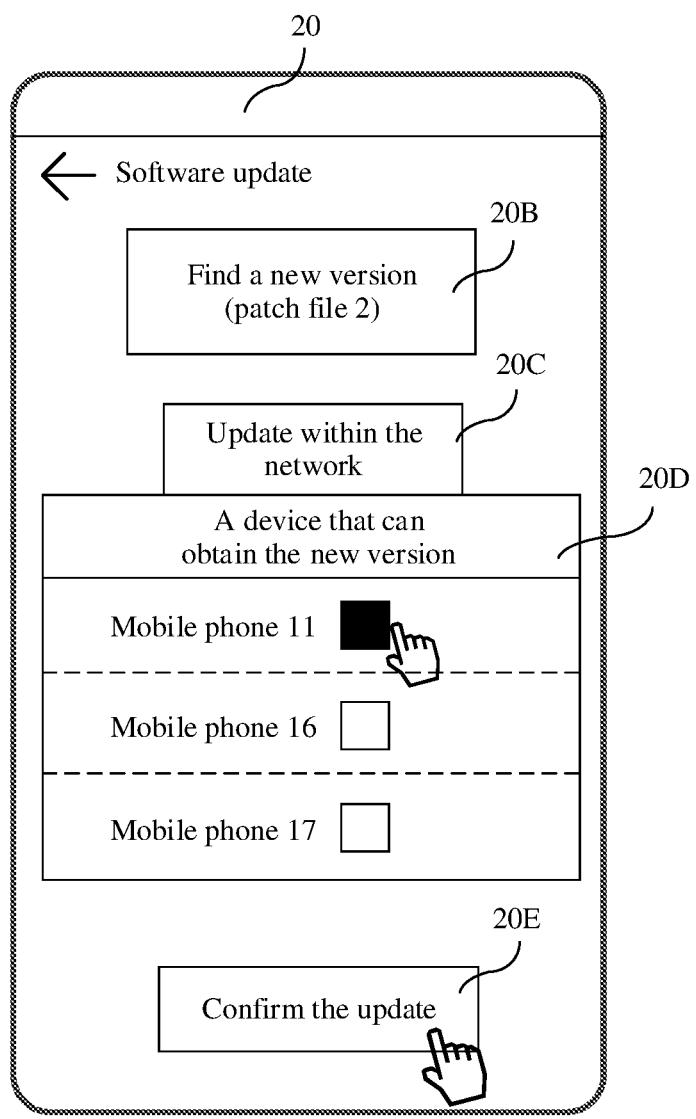

If the mobile phone 20 finds the to-be-installed patch file 2 from the network home local area network 200 (for example, the mobile phone 11, the mobile phone 16, or the mobile phone 17), the mobile phone 20 may display the display interface shown in FIG. 10B, where the display interface includes information 20B such as a name of the found patch file 2. The prompt information 20C "Update within the network" and information of the source device 20D of the patch file 2 indicate that the devices that can obtain the new version patch include the mobile phone 11, the mobile phone 16, and the mobile phone 17.

The mobile phone 20 may determine, based on a tap operation performed by the user on boxes following the names of the mobile phone 11, the mobile phone 16, and the mobile phone 17, the device for obtaining the patch. For example, the mobile phone 20 detects a tap operation performed by the user on a box after the name of the mobile phone 11, and the mobile phone 20 obtains the patch file 2 from the mobile phone 11 when performing the patch obtaining operation.

In addition, the mobile phone 20 may further display a "Confirm the update" control 20E. If the mobile phone 20 detects a tap operation performed by the user on the "Confirm the update" control 20E, the mobile phone 20 obtains the patch file 2 from the mobile phone 11 and installs the patch file 2.

Figure 10C:
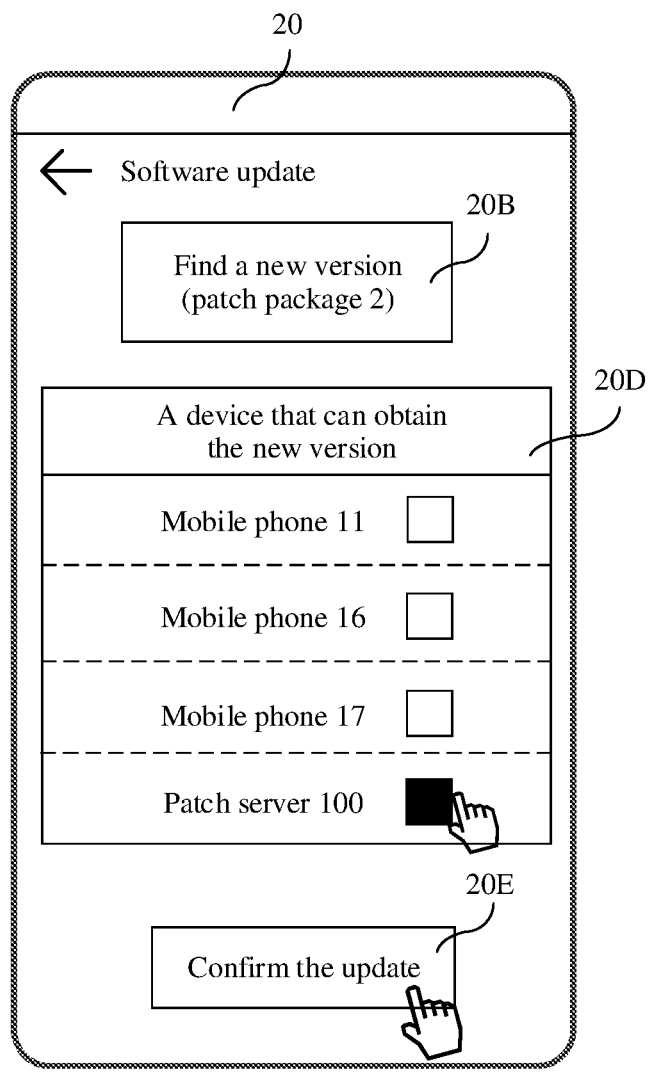

In another implementation of this application, after the mobile phone 20 performs a patch search, the mobile phone 20 may also display the interface shown in FIG. 10C. That is, the information of the source device 20D may include the mobile phone 11, the mobile phone 16, and the mobile phone 17 that can obtain the patch in the network home local area network 200, and the patch server 100 that can obtain the patch. If the mobile phone 20 detects a click operation performed by the user on a box after the name of the patch server 100, the mobile phone 20 obtains the patch package 2 from the patch server 100 when performing a patch obtaining operation.

For the foregoing step S203, when the mobile phone 20 obtains a device type of each device in the home local area network 200, and determines that the home local area network 200 belongs to a same device type as the mobile phone 20, if devices of a same device type as the mobile phone 20 in the home local area network 200 include the mobile phone 11, the mobile phone 16, and the mobile phone 17, the foregoing step S204 in which the mobile phone 20 obtains version information of patches whose product types are productA and that is of the same device type to perform version matching may be that the mobile phone 20 separately obtains the version information of patches whose product types are productA and that are of the mobile phone 11, the mobile phone 16, and the mobile phone 17 to perform version matching. The foregoing step S205 in which the mobile phone 20 determines whether the corresponding patch has been installed on devices that are of a same type and that have patches of a same version number may be that the mobile phone 20 determines whether a patch whose identity identification information is productA+Version00 and whose patch type is apkpatch has been installed on a successfully matched device, that is, whether the patch package 2 has been installed. If the patch package 2 has been installed, the mobile phone 20 performs step S206. In this case, step S206 may be that the mobile phone 20 obtains the patch file 2 of the patch package 2 from the device on which the patch has been installed. If there are a plurality of devices on which the patch has been installed, the mobile phone 20 may obtain the patch file 2 of the patch package 2 from any device on which the patch package 2 has been installed.

In another implementation of the patch reuse method provided in this application, the AP router 10 may be used as a reused patch downloading device. When a device in the home local area network 200 needs to download a patch, the device sends a patch downloading request to the AP router 10. After the AP router 10 receives the patch downloading request, the AP router 10 generates and sends the foregoing patch obtaining request to the patch server 100 to obtain the reused patch package, and obtains, based on the reused patch package, a patch required by each device, and sending the patch to each device.

Certainly, in this application, the reused patch downloading device may also be another device in the home local area network 200, and may be set as required.

In another implementation of this application, the mobile phone 11 may also generate the patch reuse information based on patch matching information of all online devices on the device side, or generate the patch reuse information based on patch matching information of devices of a same device type on the device side. Alternatively, the patch reuse information is generated based on patch matching information of another device that meets a preset condition.

The foregoing system provided in this application may be considered as an all-scenario smart living system corresponding to a home scenario, and the AP router 10 provides a network service for each device in the system. The mobile phone 11 is used as a main entrance of the entire system, and the PC 12, the tablet computer 13, the large-screen device 14, and wearable devices such as the bracelet 101, the watch 102, and the headset 103 are subsidiary entrances. Configuration of Internet of Things devices such as other home appliances can cover a plurality of scenarios. When the device in the system needs to download a patch for patch update, the mobile phone 11 may obtain, from the patch server 100, a patch that needs to be downloaded by each device in the system, and another device only needs to obtain a required patch from the mobile phone 11, and the another device does not need to separately obtain the required patch from the patch server 100. This avoids a problem that the patch of the patch server 100 is downloaded by the device on the device side for multiple times, and improves the patch installation efficiency in the system.

In this application, the foregoing near field communication may mean a communication manner such as Wi-Fi, Bluetooth, or a mobile hotspot, or may also mean another communication manner.

Figure 11:
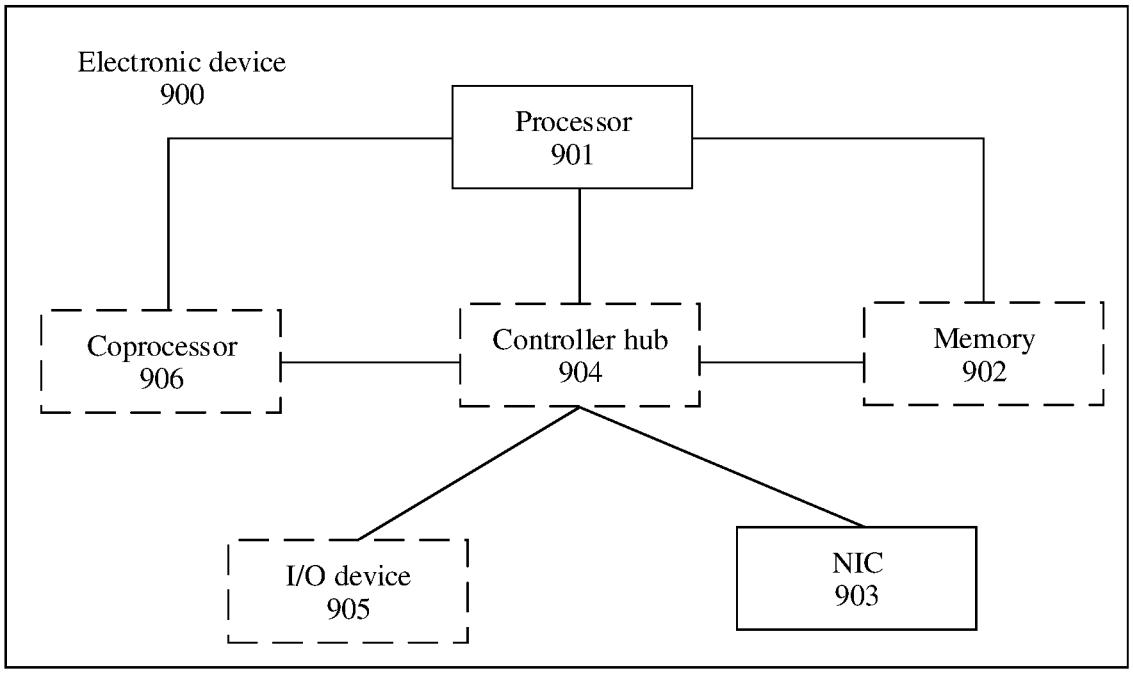
FIG. 11 is a schematic diagram depicting a structure of an electronic device according to some embodiments of this application.

FIG. 11 is a schematic diagram depicting a structure of an electronic device 900 according to an implementation of this application. The electronic device 900 may include one or more processors 901 that are coupled to a controller hub 904. In at least one embodiment, the controller hub 904 communicates with the processor 901 through a multi-branch bus such as a front side bus (FSB), a point-to-point interface such as a quick path interconnect (QPI), or a similar connection. The processor 901 executes an instruction for controlling a general type of data processing operation. In an embodiment, the controller hub 904 includes, but is not limited to, a graphics memory controller hub (GMCH) (not shown in the figure) and an input/output hub (IOH) (which may be on a separate chip) (not shown in the figure). The GMCH includes a memory and a graphics controller, and is coupled to the IOH.

The electronic device 900 may further include a coprocessor 906 and a memory 902 that are coupled to the controller hub 904. Alternatively, one or both of the memory 902 and the GMCH may be integrated into the processor 901 (as described in this application), the memory 902 and the coprocessor 906 are directly coupled to the processor 901 and the controller hub 904, and the controller hub 904 and the IOH are located in a single chip.

The memory 902 may be, for example, a dynamic random access memory (DRAM), a phase change memory (PCM), or a combination thereof.

In an embodiment, the coprocessor 906 is a dedicated processor, for example, a high-throughput MIC processor, a network or communication processor, a compression engine, a graphics processor, a GPGPU, or an embedded processor. Optional properties of the coprocessor 906 are represented by using dashed lines in FIG. 11.

In an embodiment, the electronic device 900 may further include a network interface (NIC) 903. The network interface 903 may include a transceiver, configured to provide a radio interface for the electronic device 900, so as to communicate with any other suitable device (such as a front-end module or an antenna). In various embodiments, the network interface 903 may be integrated with another component of the electronic device 900. The network interface 903 may implement functions of the communication unit in the foregoing embodiments.

The electronic device 900 may further include an input/output (I/O) device 905. The input/output (I/O) device 905 may include: a user interface, where such design enables a user to interact with the electronic device 900; and a design of a peripheral component interface enables a peripheral component to also interact with the electronic device 900; and/or a sensor is designed to determine an environmental condition and/or location information related to the electronic device 900.

It should be noted that FIG. 11 is merely an example. That is, although FIG. 11 shows that the electronic device 900 includes a plurality of components such as the processor 901, the controller hub 904, and the memory 902, in actual application, a device that uses the methods in this application may include only some of the components of the electronic device 900, for example, only the processor 901 and the NIC 903 may be included. Properties of the optional components in FIG. 11 are shown by using dashed lines.

The memory of the electronic device 900 may include one or more tangible, non-transitory computer-readable storage media configured to store data and/or instructions. The computer readable storage medium stores an instruction, and in particular, stores temporary and permanent copies of the instruction.

In this application, the electronic device 900 may be specifically terminal device such as the foregoing mobile phone, tablet computer, personal digital assistant (Personal Digital Assistant, PDA), or a desktop computer. The instruction stored in the memory of the electronic device may include an instruction that is executed by at least one unit in the processor and that makes the electronic device implement the patch reuse method mentioned above.

Figure 12:
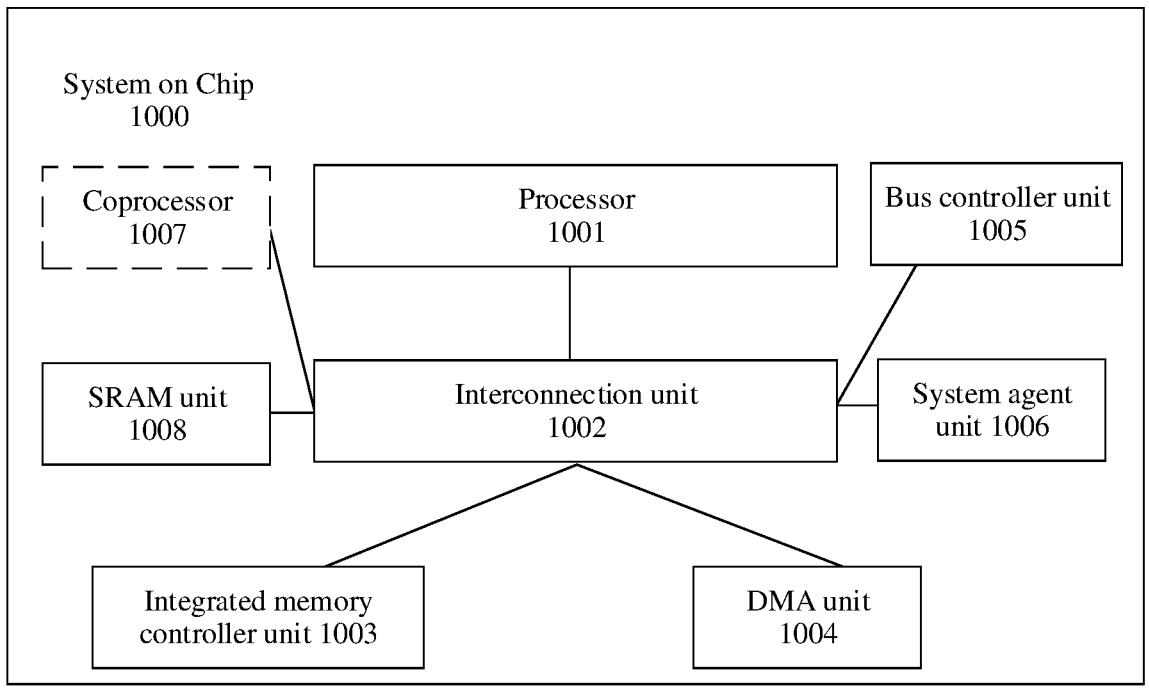
FIG. 12 is a schematic diagram depicting a structure of a system on chip (SoC) according to some embodiments of this application.

FIG. 12 is a schematic diagram depicting a structure of a SoC (System on Chip, System on Chip) 1000 according to an implementation of this application. In FIG. 12, similar components have same reference signs. In addition, the dotted box is an optional feature of a more advanced SoC 1000. The SoC 1000 may be configured to implement, according to any electronic device in this application, a corresponding function based on a different device in which the SoC 1000 is located and a different instruction stored in the SoC 1000.

In FIG. 12, the SoC 1000 includes: an interconnection unit 1002 coupled to a processor 1001; a system agent unit 1006; a bus controller unit 1005; an integrated memory controller unit 1003; one or more coprocessors 1007 that may include integrated graphics logic, an image processor, an audio processor, and a video processor; an SRAM (static random access memory) unit 1008; and a DMA (direct memory access) unit 1004. In an embodiment, the coprocessor 1007 includes a dedicated processor, for example, a network or communication processor, a compression engine, a GPGPU, a high-throughput MIC processor, or an embedded processor.

The SRAM unit 1008 may include one or more computer-readable storage media configured to store data and/or instructions. The computer-readable storage medium may store an instruction, and in particular, store temporary and permanent copies of the instruction. The instruction may include an instruction that makes the electronic device implement the patch reuse method mentioned above when the instruction is executed by at least one unit in the processor.

Embodiments of the mechanisms disclosed in this application may be implemented in a manner such as software, hardware, firmware, or a combination of these implementation manners. Embodiments of this application may be implemented as a computer program or program code executed on a programmable system. The programmable program includes at least one processor and a memory (or a storage system, including a volatile and non-volatile memory and/or a storage unit).

It should be noted that the terms "first", "second", and the like are merely intended for distinctive description, and shall not be understood as an indication or implication of relative importance.

It should be noted that in the accompanying drawings, some structural or method features may be shown in a particular arrangement and/or order. However, it should be understood that such a particular arrangement and/or order may not be required. Instead, in some implementations, these features may be arranged in a manner and/or order different from those shown in the illustrative figures. In addition, the structural or method features that are included in a particular figure does not imply that such features are required in all implementations, and in some implementations, these features may not be included or may be combined with other features.

Although this application has been illustrated and described with reference to some preferred implementations of this application, a person of ordinary skill in the art should understand that the foregoing content further describes this application in detail with reference to specific implementations, and it cannot be considered that specific implementations of this application are merely limited to these descriptions. A person skilled in the art may make various changes in form and details, including making several simple deductions or replacements, without departing from the spirit and the scope of this application.

What is claimed is:

1. A method, applied to a system comprising a plurality of devices and a patch server, wherein the patch server provides patches for the plurality of devices, the plurality of devices are located in a same local area network, the plurality of devices comprise at least a first electronic device and a second electronic device, and the method comprises:
sending, by the first electronic device, a first patch query request to the patch server, wherein the first patch query request comprises reused patch matching information, the reused patch matching information comprises first patch matching information of the first electronic device and second patch matching information of the second electronic device that belongs to the same local area network as the first electronic device, and each piece of patch matching information corresponds to a matching patch file;
generating, by the patch server, a reused patch package based on the first patch query request, and sending the reused patch package to the first electronic device, wherein the reused patch package comprises a first patch file corresponding to the first patch matching information and a second patch file corresponding to the second patch matching information, and generating, by the patch server, the reused patch package based on the first patch query request comprises:
determining, by the patch server, the first patch file corresponding to the first patch matching information, and determining the second patch file corresponding to the second patch matching information, and
using, by the patch server, a same part in the first patch file and the second patch file as a common part, using parts that are different in the first patch file and the second patch file as a differential part, and using the common part and the differential part as the reused patch package;
receiving, by the first electronic device, the reused patch package, and extracting the first patch file and the second patch file from the reused patch package;
after receiving, by the first electronic device, the reused patch package, decompressing, by the first electronic device, the reused patch package to obtain the common part and the differential part, and
performing, by the first electronic device, patch restoration and synthesis processing based on the common part and the differential part to separately obtain the first patch file and the second patch file; and
directly obtaining, by the second electronic device, the second patch file from the first electronic device within the local area network without downloading the second patch file from the patch server.

2. The method according to claim 1, further comprising:
after generating, by the patch server, the reused patch package based on the first patch query request, sending, by the patch server, a patch push message that pushes the reused patch package to the first electronic device;
after the first electronic device receives the patch push message, when the first electronic device detects an operation that a user confirms downloading of the reused patch package, sending, by the first electronic device, a first patch obtaining request to the patch server; and after the patch server receives the first patch obtaining request, sending, by the patch server, the reused patch package to the first electronic device.

3. The method according to claim 1, wherein the first electronic device and the second electronic device are trusted network devices that belong to the same local area network.

4. The method according to claim 1, wherein sending, by the first electronic device, the first patch query request to the patch server comprises:
   sending, by the second electronic device, a second patch query request to the first electronic device, wherein the second patch query request comprises the second patch matching information of the second electronic device, and after the first electronic device receives the second patch query request, sending, by the first electronic device, the first patch query request to the patch server; or
   sending, by the first electronic device, the first patch query request to the patch server based on a preset patch query period; or
   after the first electronic device receives a patch query instruction of a user, sending, by the first electronic device, the first patch query request to the patch server.

5. The method according to claim 1, wherein each piece of the patch matching information comprises device type information, device software version information, and patch type information of the respective matching patch file.

6. The method according to claim 1, wherein the plurality of devices further comprises a third electronic device, and the method further comprises:
   obtaining, by the third electronic device, a network identifier of the local area network; and when determining, based on the network identifier, that the local area network in which the third electronic device is located is a trusted network, obtaining, by the third electronic device, the second patch matching information of the second electronic device that is in the local area network and that has a same device type as that of the third electronic device; and
   when the third electronic device determines that the second patch matching information is the same as third patch matching information of the third electronic device, obtaining, by the third electronic device, the second patch file from the second electronic device.

7. The method according to claim 6, wherein determining, by the third electronic device, that the local area network is the trusted network comprises:
   when a trusted network identifier in the third electronic device comprises the network identifier that is obtained by the third electronic device and that is of the local area network, determining, by the third electronic device, that the local area network is the trusted network.

8. The method according to claim 6, further comprising:
   when the third electronic device determines that the second electronic device has installed the second patch file, obtaining, by the third electronic device, the second patch file from the second electronic device.

9. The method according to claim 1, wherein the plurality of devices further comprise a third electronic device, and the method further comprises:
   obtaining, by the third electronic device, a network identifier of the local area network, and when determining, based on the network identifier, that the local area network in which the third electronic device is located is an untrusted network, sending, by the third electronic device, a third patch query request to the first electronic device, wherein the third patch query request comprises third patch matching information of the third electronic device;
   when the first electronic device determines, based on the third patch query request, that the reused patch package comprises a patch file corresponding to the third electronic device, sending, by the first electronic device, the reused patch package to the third electronic device; and
   receiving, by the third electronic device, the reused patch package, and extracting the patch file corresponding to the third electronic device from the reused patch package that is to be installed on the third electronic device.

10. The method according to claim 1, wherein the plurality of devices further comprise a third electronic device, and the method further comprises:
    obtaining, by the third electronic device, a network identifier of the local area network, and when it is determined, based on the network identifier, that the local area network in which the third electronic device is located is an untrusted network, sending, by the third electronic device, an obtaining request that requests the reused patch matching information to the first electronic device, to obtain the reused patch matching information;
    when the third electronic device determines, based on the reused patch matching information, that the reused patch matching information comprises third patch matching information corresponding to the third electronic device, sending, by the third electronic device, a reused patch obtaining request to the first electronic device;
    sending, by the first electronic device, the reused patch package to the third electronic device based on the reused patch obtaining request; and
    receiving, by the third electronic device, the reused patch package, and extracting a patch file that is to be installed on the third electronic device.

11. A method, applied to a first electronic device, the method comprising:
    sending a first patch query request to a patch server, wherein the first patch query request comprises reused patch matching information, the reused patch matching information comprises first patch matching information of the first electronic device and second patch matching information of a second electronic device that belongs to a same local area network as the first electronic device, and each piece of the patch matching information corresponds to a matching patch file;
    receiving a reused patch package that is sent by the patch server and that is generated based on the first patch query request, wherein the reused patch package comprises a first patch file corresponding to the first patch matching information and a second patch file corresponding to the second patch matching information;
    after receiving the reused patch package, decompressing, by the first electronic device, the reused patch package to obtain a common patch and a differential patch;
    performing patch restoration and synthesis processing based on the common patch and the differential patch to separately obtain the first patch file and the second patch file; and
    extracting, from the reused patch package, the first patch file and the second patch file, and directly sending the second patch file from the first electronic device to the second electronic device within the local area network without the second electronic device downloading the second patch file from the patch server.

12. The method according to claim 11, further comprising:
receiving a patch push message; and
after receiving the patch push message, when it is detected that a user confirms downloading of the reused patch package, sending a first patch obtaining request to the patch server.

13. The method according to claim 11, wherein the first electronic device and the second electronic device are trusted network devices that belong to the same local area network.

14. An electronic device, comprising:
a memory, configured to store a computer program, wherein the computer program comprises program instructions; and
a controller, configured to execute the program instructions, and executing the program instructions enables the electronic device to:
send a first patch query request to a patch server, wherein the first patch query request comprises reused patch matching information, the reused patch matching information comprises first patch matching information of the electronic device and second patch matching information of a second electronic device that belongs to a same local area network as the electronic device, and each piece of the patch matching information corresponds to a matching patch file;
receive a reused patch package that is sent by the patch server and that is generated based on the first patch query request, wherein the reused patch package comprises a first patch file corresponding to the first patch matching information and a second patch file corresponding to the second patch matching information;
after receiving the reused patch package, decompress the reused patch package to obtain a common patch and a differential patch;
perform patch restoration and synthesis processing based on the common patch and the differential patch to separately obtain the first patch file and the second patch file; and
extract, from the reused patch package, the first patch file and the second patch file, and directly send the second patch file from the electronic device to the second electronic device within the local area network without the second electronic device downloading the second patch file from the patch server.

15. The electronic device according to claim 14, wherein executing the program instructions enables the electronic device to:
receive a patch push message; and
after receiving the patch push message, when it is detected that an operation that a user confirms downloading of the reused patch package, send a first patch obtaining request to the patch server.

16. The electronic device according to claim 14, wherein the electronic device and the second electronic device are trusted network devices that belong to the same local area network.

* * * * *